United States Patent
Kamioka et al.

(10) Patent No.: US 8,408,560 B2
(45) Date of Patent: Apr. 2, 2013

(54) SADDLE RIDING TYPE VEHICLE

(75) Inventors: Takamasa Kamioka, Shizuoka (JP); Kotaro Ogura, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 122 days.

(21) Appl. No.: 12/952,379

(22) Filed: Nov. 23, 2010

(65) Prior Publication Data

US 2011/0121524 A1 May 26, 2011

(30) Foreign Application Priority Data

Nov. 24, 2009 (JP) ................................. 2009-266315

(51) Int. Cl.
*B60G 17/016* (2006.01)
*B60G 17/02* (2006.01)
*B60G 11/27* (2006.01)

(52) U.S. Cl. .................. 280/5.512; 180/190; 280/5.515; 280/6.159; 280/124.106; 280/124.16

(58) Field of Classification Search .................. 180/190, 180/193, 908; 280/5.51, 5.512, 5.515, 6.159, 280/6.16, 124.106, 124.107, 124.127, 124.135, 280/124.145, 124.154, 124.157, 124.161
See application file for complete search history.

(56) References Cited

U.S. PATENT DOCUMENTS

| | | | | |
|---|---|---|---|---|
| 2,555,649 A * | 6/1951 | Krotz | ......................... | 280/124.13 |
| 2,650,108 A * | 8/1953 | Bruce | ......................... | 280/5.503 |
| 3,613,812 A * | 10/1971 | Hetteen | ............................ | 280/25 |
| 4,328,878 A * | 5/1982 | Yoshida | ........................ | 180/182 |
| 4,361,339 A * | 11/1982 | Kobayashi | .................... | 280/21.1 |
| 4,374,591 A * | 2/1983 | Kobayashi | .................... | 280/21.1 |
| 4,509,766 A * | 4/1985 | Yasui et al. | .................. | 280/21.1 |
| 4,591,173 A * | 5/1986 | Marier | ......................... | 280/21.1 |
| 4,593,921 A | 6/1986 | Marier | | |
| 4,815,759 A * | 3/1989 | Imai et al. | ..................... | 280/21.1 |
| 6,276,693 B1 * | 8/2001 | Oakley et al. | .............. | 280/5.506 |
| 6,311,798 B1 * | 11/2001 | Anderson | ..................... | 180/182 |
| 6,357,543 B1 * | 3/2002 | Karpik | .......................... | 180/182 |
| 6,763,905 B2 * | 7/2004 | Cocco et al. | .................. | 180/210 |
| 6,942,050 B1 * | 9/2005 | Honkala et al. | ............... | 180/182 |
| 7,249,647 B2 * | 7/2007 | Nietlispach | .................... | 180/190 |
| 7,255,195 B2 * | 8/2007 | Haruna | ......................... | 180/209 |
| 7,422,083 B2 * | 9/2008 | Yoshihara et al. | ............ | 180/182 |
| 7,478,694 B2 * | 1/2009 | Abe et al. | ...................... | 180/182 |
| 7,485,984 B2 * | 2/2009 | Fulks et al. | ................... | 307/10.1 |
| 7,896,371 B2 * | 3/2011 | Matsuura | ............... | 280/124.135 |
| 7,954,835 B2 * | 6/2011 | Nakamura et al. | ..... | 280/124.135 |
| 8,123,240 B2 * | 2/2012 | Mercier | ................. | 280/124.103 |

FOREIGN PATENT DOCUMENTS

JP       06-072127 A       3/1994

* cited by examiner

*Primary Examiner* — Paul N Dickson
*Assistant Examiner* — Laura Freedman
(74) *Attorney, Agent, or Firm* — Keating & Bennett, LLP

(57) ABSTRACT

A saddle riding vehicle that allows the amount of roll to be reduced includes a vehicle body, a handle, and a suspension mechanism. The suspension mechanism is provided at a front portion of the vehicle body and supports a pair of left and right front wheels or a pair of left and right skis. The suspension mechanism includes a pair of left and right arm members and a pair of left and right air shock absorbers. The pair of left and right arm members supports the pair of front wheels or the pair of skis in a vertically movable manner. The pair of left and right air shock absorbers is coupled to the pair of arm members. The pair of left and right air shock absorbers each includes a cylinder, a piston, a piston rod, a first gas chamber, and a second gas chamber.

20 Claims, 22 Drawing Sheets

F I G. 1
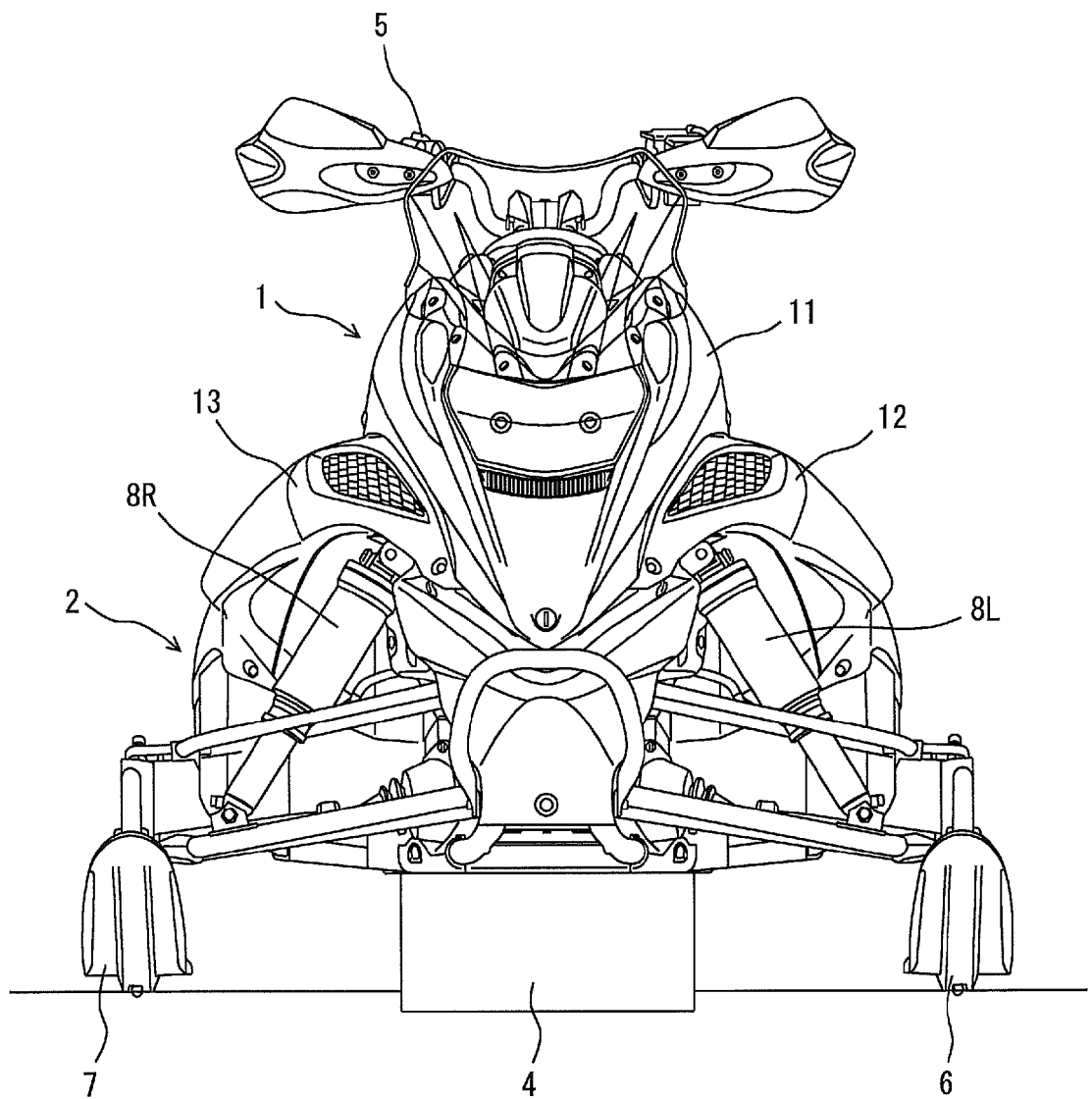

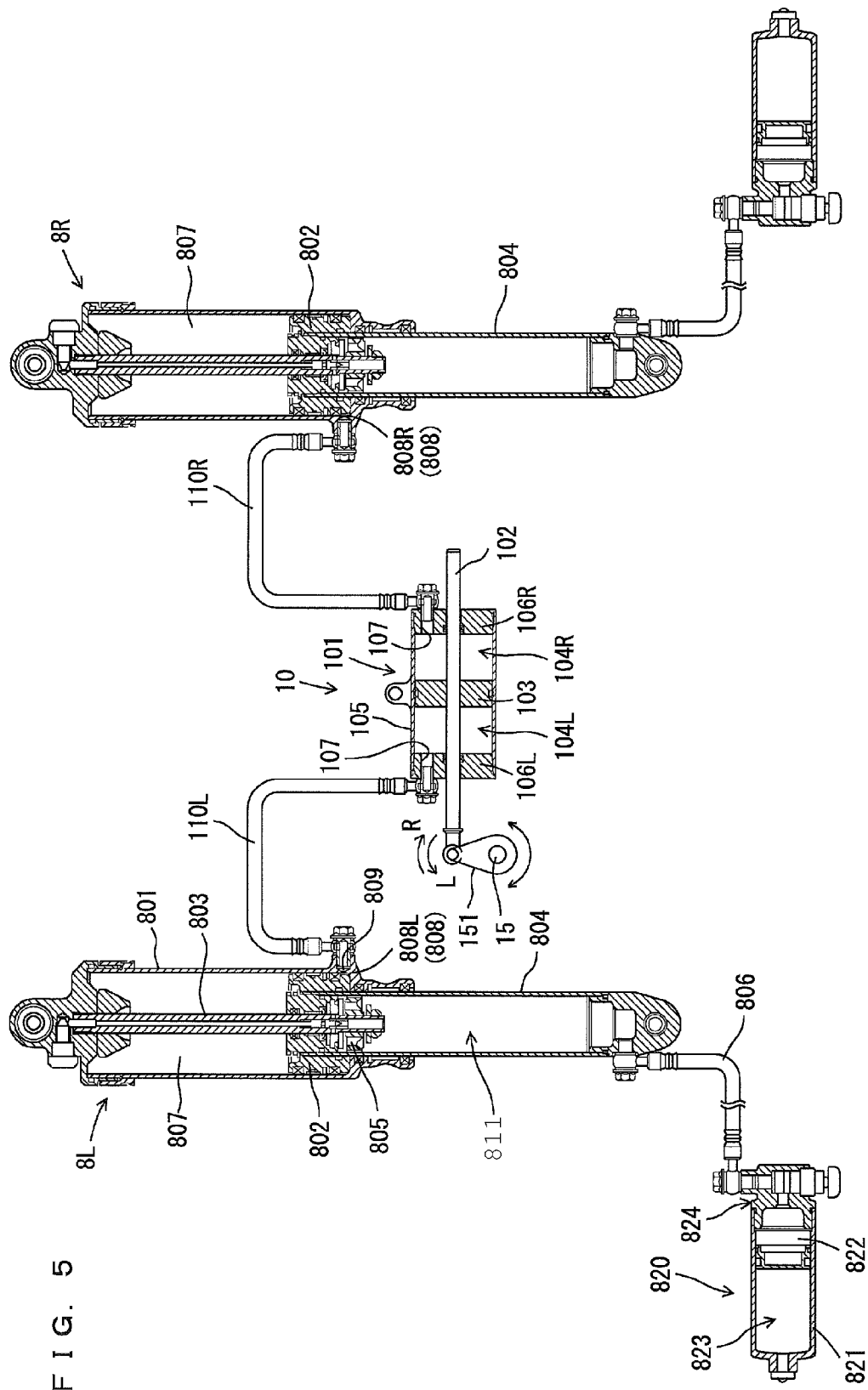
F I G. 5

SADDLE RIDING TYPE VEHICLE

BACKGROUND OF THE INVENTION

1. Field of the Invention

The present invention relates to saddle riding type vehicles, and more specifically to a saddle riding type vehicle having a pair of left and right wheels or skis at the front portion of the vehicle.

2. Description of the Related Art

JP 6-72127 A discloses a suspension system for a four-wheeled vehicle. The disclosed suspension system has hydraulic cylinders on the right and left of the vehicle body. The upper oil chamber of each of the hydraulic cylinders is communicated with the oil chamber of each pressure regulating cylinder and the free pistons of the pressure regulating cylinders are interlocked with each other. In addition, a throttle member is provided between the flow paths of hydraulic cylinders. When the two hydraulic cylinders have different operation directions, the throttle member serves to provide a damping effect.

U.S. Pat. No. 4,593,921 discloses a stabilizer system for a snowmobile. The disclosed stabilizer system includes a pair of suspensions provided on the left and right of the front portion of the vehicle body and an air tank. The pair of suspensions includes a pair of air chambers. The air chambers are each communicated with the air tank through a corresponding valve. When the snowmobile advances straightforward, the valve is open. When the handle is steered, the valve between the air chamber provided on the opposite side to the steering direction of the handle and the air tank is closed. In this way, the air chamber provided on the opposite side to the steering direction is disconnected from the air tank. This raises the reaction force. On the other hand, the air chamber provided on the side of the steering direction is kept connected to the air tank. Therefore, the reaction force differs between the air chamber on the same side as the steering direction and the air chamber on the opposite side to the steering direction. As a result, the amount of rolling during turning can be reduced.

SUMMARY OF THE INVENTION

In the suspension system disclosed by JP 6-72127 A, when the vehicle body rolls in response to steering operation and a phase difference is generated between the left and right hydraulic cylinders, the damping force for the left and right hydraulic cylinders is changed. Therefore, the disclosed suspension system can control the rolling speed but not the rolling amount.

In the stabilizer system disclosed by U.S. Pat. No. 4,593,921, the difference in the reaction force between the air chamber on the same side as the steering direction and the air chamber on the opposite side to the steering direction must be increased in order to reduce a roll amount during turning. In order to increase the reaction force difference, the capacity of the air chambers must be increased.

An object of preferred embodiments of the invention is to provide a saddle riding type vehicle that allows a roll amount to be reduced.

A saddle-riding type vehicle according to a preferred embodiment of the present invention includes a vehicle body, a handle, and a suspension mechanism. The handle is provided at the front portion of the vehicle body. The suspension mechanism is provided at the front portion of the vehicle body and supports a pair of left and right front wheels or a pair of left and right skis. The suspension mechanism includes a pair of left and right arm members and a pair of left and right air shock absorbers. The pair of left and right arm members supports a pair of front wheels or a pair of skis in a vertically movable manner. The pair of left and right air shock absorbers is coupled to the pair of arm members. The pair of left and right air shock absorbers each includes a cylinder, a piston, a piston rod, a first gas chamber, a second gas chamber, and a regulator. The cylinder stores gas. The piston is stored in the cylinder and has a front surface and a back surface. The piston rod is coupled to the back surface of the piston. The first gas chamber is provided on the front surface side of the piston in the cylinder. The second gas chamber is provided on the back surface side of the piston in the cylinder. The regulator regulates the reaction force of the first gas chamber and/or the second gas chamber in response to steering of the handle.

The saddle riding type vehicle according to the preferred embodiment of the invention allows the roll amount to be reduced.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 1 is a front view of a saddle riding type vehicle according to a first preferred embodiment of the present invention.

FIG. 5 is a sectional view of air shock absorbers and a regulator in FIGS. 3 and 4.

DETAILED DESCRIPTION OF THE PREFERRED EMBODIMENTS

Figure 2:
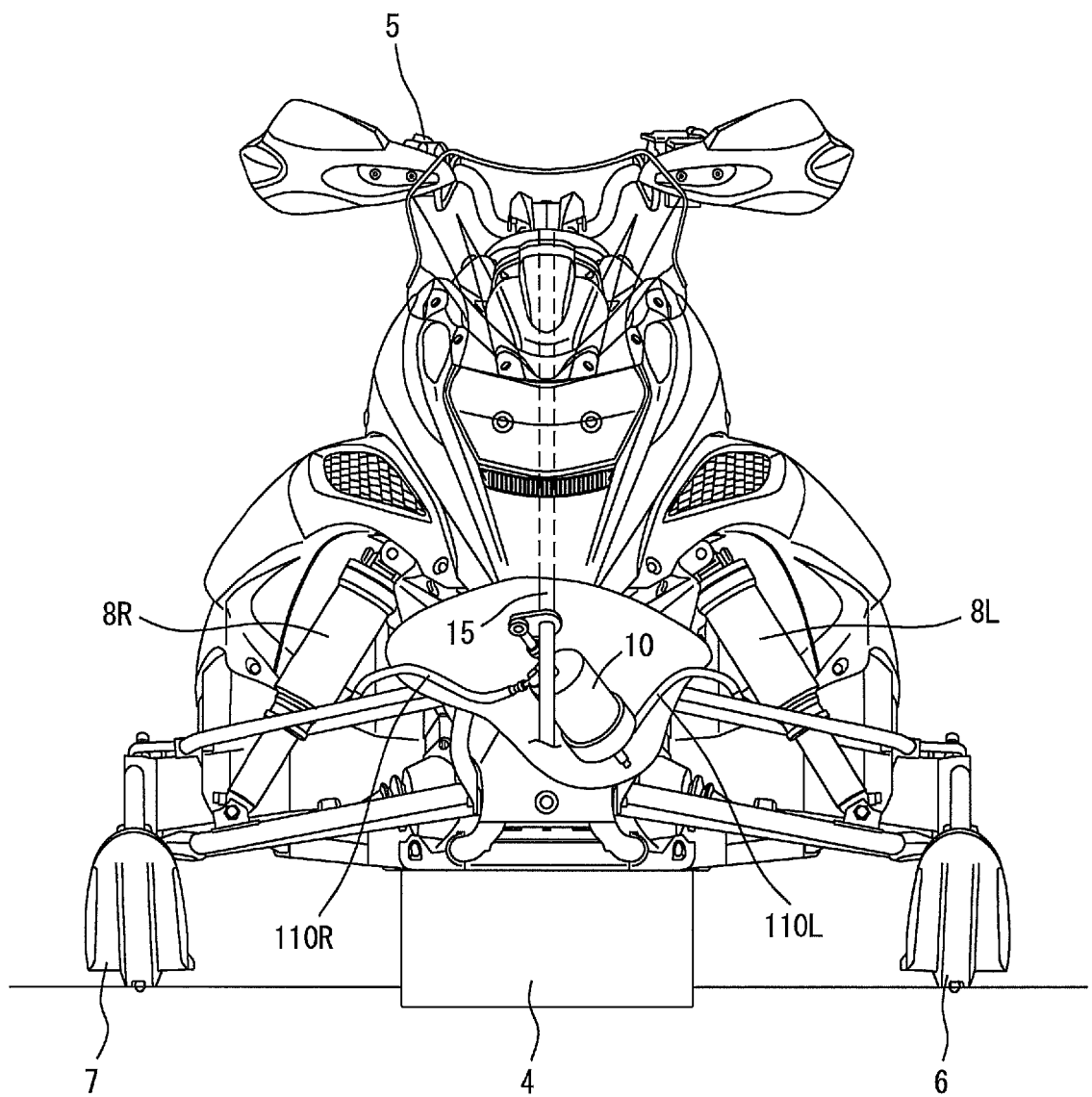
FIG. 2 is a front view of the saddle riding type vehicle removed of a part of a front cover in FIG. 1.

Now, preferred embodiments of the present invention will be described in detail in conjunction with the accompanying drawings, in which the same or corresponding portions are designated by the same reference characters and their description will not be repeated.

General Structure of Saddle Riding Type Vehicle

FIG. 1 is a front view of a saddle riding type vehicle according to a preferred embodiment of the invention. According to the present preferred embodiment, the saddle riding type vehicle is a snowmobile by way of illustration. In the following description, the front, back, left, and right refer to these directions seen from a rider seated on a snowmobile.

The snowmobile 100 includes a vehicle body 1, a suspension mechanism 2, a track belt 4, and a handle 5.

The vehicle body 1 has a frame. The handle 5 is attached to the front portion of the vehicle body 1. A front cover 11 is provided at the front end of the vehicle body 1. Left and right side covers 12 and 13 are provided at the lower sides of the front cover 11. A seat is provided above the vehicle body 1 and an engine is provided at the frame. Left and right footrests are provided apart from each other under the seat. In other words, the snowmobile is a saddle riding type vehicle.

The track belt 4 is connected to the engine through a driving unit. The track belt 4, the driving unit, and the engine have well-known structures and therefore will not be described.

The suspension mechanism 2 is provided at the front portion of the vehicle body 1 and supports a pair of left and right skis 6 and 7 movably in the vertical direction relative to the vehicle body 1. The suspension mechanism further includes a pair of left and right air shock absorbers 8L and 8R. The air shock absorber 8R is provided on the right side of the suspension mechanism 2 (when seen from a rider on the vehicle), and the ski 7 is attached to the lower end. The air shock absorber 8L is provided on the left side of the suspension mechanism 2 and the ski 6 is attached to the lower end.

FIG. 2 is a partly cutaway front view of the snowmobile 100 showing a part of the front cover 11 of the vehicle body 1. Referring to FIG. 2, the snowmobile 100 further includes a regulator 10 and a steering shaft 15. The handle 5 is attached to the upper end of the steering shaft 15. When the handle 5 is turned to the left and right, the steering shaft 15 also turns to the left and right. The regulator 10 is provided near the center of the suspension mechanism 2. The regulator 10 is connected to the air shock absorbers 8L and 8R through gas hoses 110L and 110R. The regulator 10 is further coupled to the steering shaft 15. The regulator 10 regulates the reaction force of the shock absorbers 8L and 8R depending on the turning of the handle 5 attached to the steering shaft 15. Now, the suspension mechanism 2 will be described in detail.

Suspension Mechanism 2

Figure 3:
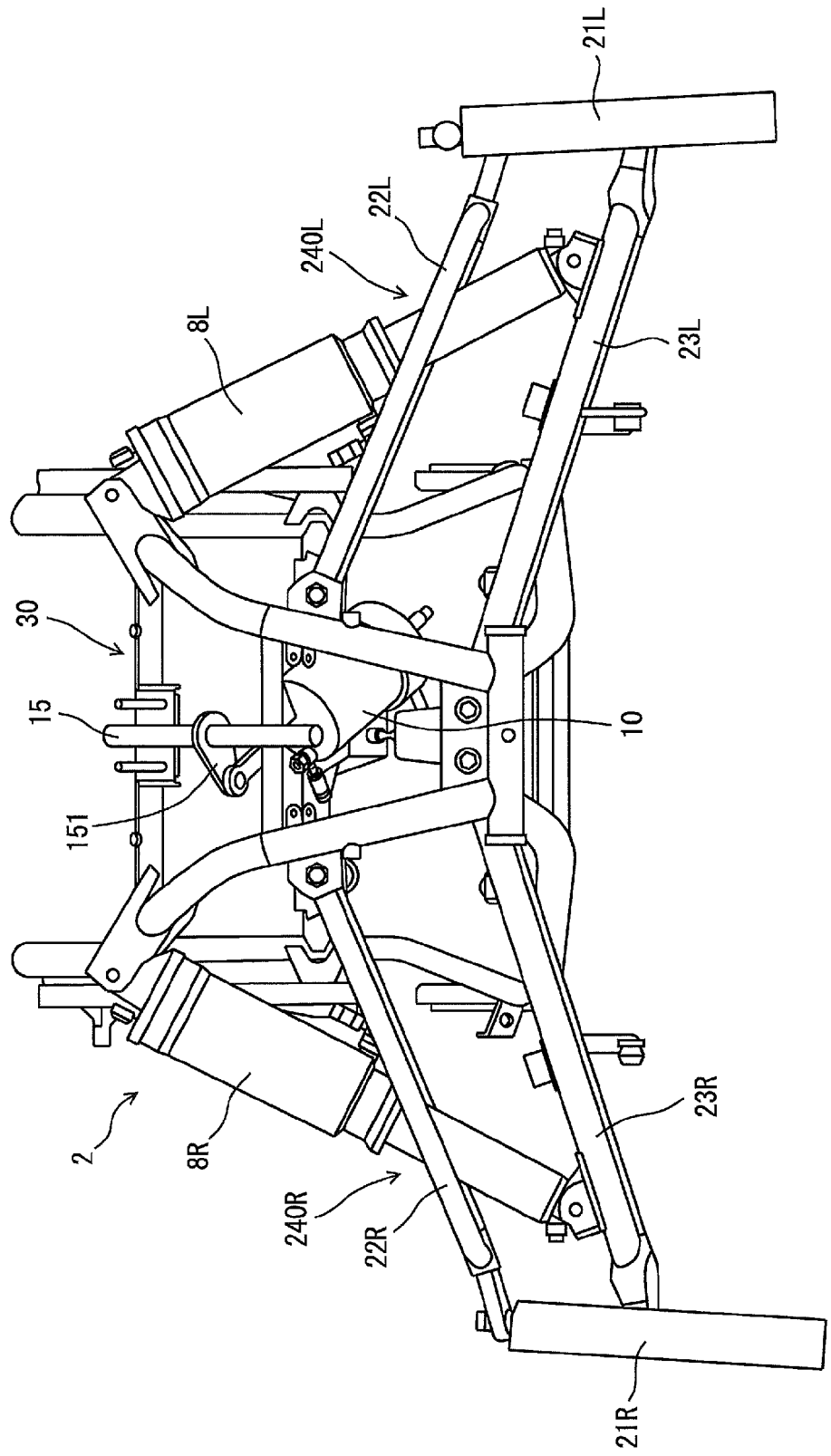
FIG. 3 is a front view of a suspension mechanism.
Figure 4:
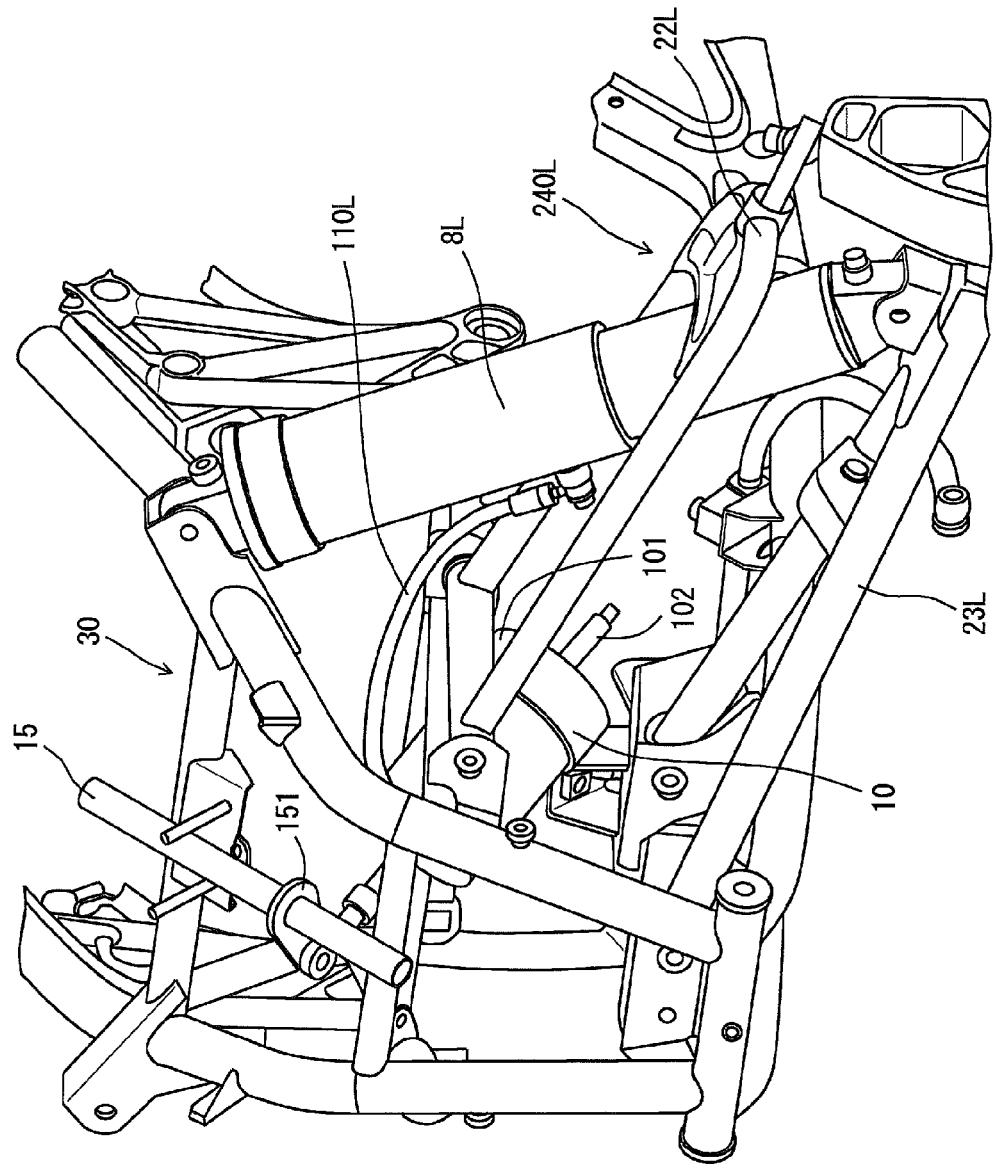
FIG. 4 is a perspective view of a suspension mechanism as seen from the front left of a snowmobile.

FIG. 3 is a front view of the suspension mechanism 2 and FIG. 4 is a perspective view of the suspension mechanism 2 when seen from the front left of the snowmobile 100. Referring to FIGS. 3 and 4, the suspension mechanism 2 is a so-called double wishbone type mechanism. The suspension mechanism 2 includes a pair of coupling members 21L and 21R and a pair of arm members 240L and 240R. The arm member 240L includes an upper arm 22L and a lower arm 23L. The arm member 240R includes an upper arm 22R and a lower arm 23R.

The upper arms 22L and 22R and the lower arms 23L and 23R are U-shaped members that open on the side of the vehicle body 1 (inner side) and closed on the side away from the vehicle body 1. The inner ends of the upper arms 22L and 22R are attached to the frame 30 of the vehicle body 1 so that they can rotate around the axis in the vehicle front-back direction. The inner ends of the lower arms 23L and 23R are similarly attached to the frame 30 so that they can rotate around the axis in the vehicle front-back direction. The outer ends of the upper arms 22L and 22R are supported at the upper ends of the coupling members 21L and 21R through spherical bearings. The outer ends of the lower arms 23L and 23R are supported substantially in the center of the coupling members 21L and 21R in the vertical direction through spherical bearings.

The skis 6 and 7 are coupled to the coupling members 21L and 21R, respectively. Therefore, the arm members 240L and 240R support the skis 6 and 7 movably in the vertical direction.

The pair of air shock absorbers 8L and 8R is coupled to the arm members 240L and 240R. More specifically, the air shock absorbers 8L and 8R have their lower ends coupled to the outer ends of the lower arms 23L and 23R and their upper ends coupled to the frame 30. The coupling portions are coupled by pins that extend in the front-back direction of the vehicle. Therefore, the upper and lower coupling ends of the air shock absorbers 8L and 8R turn around the axial centers of these pins.

Referring to FIG. 3, the regulator 10 is provided between the air shock absorbers 8L and 8R and attached to the frame 30. Referring to FIG. 4, the regulator 10 includes a columnar regulator cylinder 101 and a piston rod 102. The piston rod 102 is provided coaxially with the central axis of the regulating cylinder 101 and has its both ends provided outside the regulating cylinder 101.

The steering shaft 15 includes a coupling member 151 at the bottom. The coupling member 151 is plate-shaped and attached to the steering shaft 15 substantially orthogonally to the central axis of the steering shaft 15. A pivot shaft is provided at the tip end of the coupling member 151. The coupling member 151 is coupled rotatably to one end of the piston rod 102 through a pivot shaft. In this way, the piston rod 102 moves synchronously with the rotation of the handle 5 through the steering shaft 15.

Air Shock Absorbers 8L and 8R

FIG. 5 is a sectional view of the air shock absorbers 8L and 8R and the regulator 10 shown in FIGS. 3 and 4. Referring to FIG. 5, the air shock absorber 8L includes a cylinder 801, a piston 802, and a piston rod 804. The upper end of the cylinder 801 is attached to the frame 30. On the other hand, the lower end of the piston rod 804 is attached to the ski 7 through the lower arm 23L.

Figure 6:
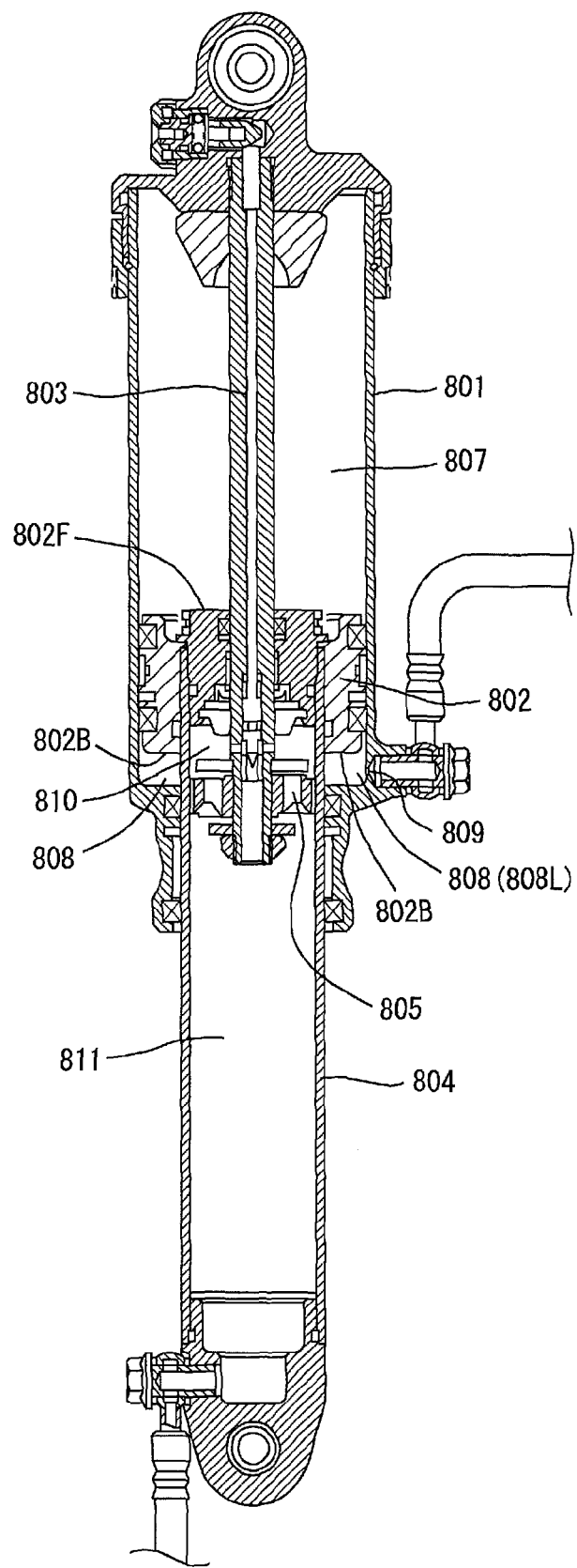
FIG. 6 is an enlarged view of the air shock absorber 8L in FIG. 5.

FIG. 6 is an enlarged view of the air shock absorber 8L in FIG. 5. Referring to FIG. 6, the cylinder 801 is cylindrical and stores gas (air in this example) and the piston 802. The piston 802 is disk-shaped and has a front surface 802F and a back surface 802B. The piston 802 moves (slides) in the axial direction in the cylinder 801.

The cylinder 801 includes gas chambers 807 and 808. The gas chamber 807 is provided on the side of the front surface 802F of the piston 802. The gas chamber 808 is provided on the side of the back surface 802B. In short, the gas chambers 807 and 808 are partitioned by the piston 802. The capacity of the gas chamber 808 is smaller than the capacity of the gas chamber 807.

The piston rod 804 is coupled to the back surface 802B of the piston 802. When a rider gets on the snowmobile 100, a load is applied on the air shock absorber 8L because of the weight of the rider. At the time, the piston rod 804 is pushed into the cylinder 801. Therefore, the piston 802 slides toward the upper end of the cylinder 801. As a result, the gas chamber 807 contracts and the gas chamber 808 expands. The contraction of the gas chamber 807 increases the reaction force of the air shock absorber 8L. In this way, the air shock absorber 8L has a buffering effect.

The air shock absorber 8L further includes a damper rod 803 and a damper piston 805. The piston rod 804 is cylindrical and stores oil. More specifically, the piston rod 804 also serves as a damper cylinder. The damper rod 803 is provided upright on the upper end surface of the cylinder 801 and extends in the axial direction of the cylinder 801. The lower end of the damper rod 803 is provided in the piston rod 804. The damper piston 805 is provided at the tip end of the damper rod 803. The damper piston 805 is disk-shaped and moves in the axial direction of the piston rod 804.

As described above, oil is stored in the piston rod 804. The piston rod 804 includes oil chambers 810 and 811. The oil chambers 810 and 811 are partitioned by the damper piston 805. The oil chamber 810 is provided on the back surface side of the damper piston 805 and the oil chamber 811 is provided on the front surface side of the damper piston 805.

The damper piston 805 has a plurality of orifices (not shown) penetrating between the front and back surfaces. Each of the orifices has a plate valve (not shown) at the opening. When a load is applied on the air shock absorber 8L, the damper piston 805 is pushed under the piston rod 804. At the time, the oil in the oil chamber 811 passes the orifices to bend the plate valve and moves to the oil chamber 810. At the time, the force applied on the air shock absorber 8L is damped. Therefore, the air shock absorber 8L also has a damping effect.

Referring back to FIG. 5, the air shock absorber 8L further includes a sub tank 820. The sub tank 820 includes a cylindrical tank main body 821 and a free piston 822. The tank main body 821 includes a gas chamber 823 and an oil chamber 824 partitioned by the free piston 822. The oil chamber 824 is communicated with the piston rod 804. When a load is applied on the air shock absorber 8L and the damper piston 805 is pushed into the piston rod 804, the oil corresponding to the capacity of the damper rod 803 entered into the piston rod 804 is pushed out from the piston rod 804. The sub tank 820 receives the pushed out oil.

The air shock absorber 8R has the same structure as the air shock absorber 8L. Therefore, in the following description, the elements of the air shock absorber 8R are designated with the same reference characters as those of corresponding elements of the air shock absorber 8L.

Regulator 10

Referring to FIG. 5, the regulator 10 includes a regulating cylinder 101, the piston rod 102, and the regulating piston 103. The regulating cylinder 101 is cylindrical and stores gas. The regulator cylinder 101 further stores the regulating piston 103. The regulating piston 103 is disk-shaped and has its outer circumferential surface opposed to the inner circumferential surface of the regulating cylinder 101. The piston 103 moves in the axial direction of the regulating cylinder 101.

The piston rod 102 is provided coaxially with the regulating cylinder 101 in the regulating cylinder 101. The piston rod 102 extends in the axial direction of the regulating cylinder 101 and has its ends provided outside the regulating cylinder 101. More specifically, the piston rod 102 penetrates through the regulating cylinder 101. The regulating piston 103 is fixed coaxially with the piston rod 102 substantially in the center of the piston rod 102.

The end of the piston rod 102 is attached to the coupling member 151 through a pivot shaft. The coupling member 151 is fixed to the steering shaft 15, and therefore the piston 103 moves in the regulating cylinder 101 synchronously with the rotation of the handle 5.

The regulating cylinder 101 includes regulating gas chambers 104L and 104R arranged next to each other in the regulating cylinder 101. The regulating gas chambers 104L and 104R are partitioned by the piston 103. The regulating gas chamber 104L is communicated with the gas chamber 808 of the air shock absorber 8L and the regulating gas chamber 104R is communicated to the gas chamber 808 of the air shock absorber 8R. More specifically, the regulating cylinder 101 includes a cylindrical member 105 and a pair of lids 106L and 106R. The pair of lids 106L and 106R is disk-shaped and attached to the ends of the cylindrical member 105. In this way, the regulating cylinder 101 is sealed. The lid 106L is provided on the side of the gas chamber 104L and the lid 106R is provided on the side of the regulating gas chamber 104R.

The lid 106L has a through hole 107. The cylinder 801 of the air shock absorber 8L has a through hole 809 extended from the outer circumferential surface to the inner circumferential surface of the gas chamber 808 (FIG. 6). The gas hose 110L is attached between the through holes 107 and 809 through a nipple. In this way, the regulating gas chamber 104L is connected to the gas chamber 808 of the air shock absorber 8L.

Similarly, the lid 106R has a through hole 107 and the cylinder 801 of the air shock absorber 8R has a through hole 809. The gas hose 110R is attached between the through holes 107 and 809 through a nipple. In this way, the regulating gas chamber 104R is connected to the gas chamber 808 of the air shock absorber 8R. In the following description, the gas chamber 808 of the air shock absorber 8L will be referred to as the "gas chamber 808L" and the gas chamber 808 of the air shock absorber 8R will be referred to as the "gas chamber 808R."

Operation of Suspension Mechanism 2

In the suspension mechanism 2, the regulating piston 103 operates together with the handle 5. When the handle 5 is steered to the left, the regulating piston 103 moves a distance corresponding to the steering angle to the side of the regulating gas chamber 104L. When the handle 5 is steered to the right, the regulating piston 103 moves a distance corresponding to the steering angle to the side of the regulating gas chamber 104R. Since the capacities of the regulating gas chambers 104L and 104R change depending on the movement of the regulating piston 103, the reaction force of the air shock absorbers 8L and 8R is regulated. More specifically, in the snowmobile 100, the reaction forces of the air shock absorbers 8L and 8R are regulated corresponding to the amount of how much the handle 5 is steered. Now, this will be described in detail.

When Advancing Straightforward

When the snowmobile 100 advances straightforward, the regulating piston 103 is stationary substantially in the center of the regulating cylinder 101. At the time the capacities of the regulating gas chambers 104L and 104R are the same. Therefore, the reaction forces of the air shock absorbers 8L and 8R are unaffected by the regulator 10. Note that at least a load corresponding to the weight of the rider is applied on the air shock absorbers 8L and 8R. Therefore, the pressure in the gas chambers 807 and 808 is higher than the atmospheric pressure.

When Steering Handle to Left

Assume that the rider on the snowmobile 100 steers the handle 5 to the left. At the time, the coupling member 151 in FIG. 5 turns in the L-direction in FIG. 5, and therefore the piston rod 102 slides to the left in FIG. 5. Therefore, the regulating piston 103 moves to the side of the regulating gas chamber 104L in the regulating cylinder 101. At the time, the piston rod 102 operates synchronously with the handle 5 by the function of the coupling member 151 and therefore the regulating piston 103 moves a distance corresponding to the steering angle of the handle 5 to the left. As a result, the capacity of the regulating gas chamber 104L is reduced and the capacity of the regulating gas chamber 104R increases corresponding to the movement amount of the regulating piston 103. In short, the contraction coefficient of the regulating gas chamber 104L corresponds to the steering angle of the handle 5 and the expansion coefficient of the regulating gas chamber 104R corresponds to the steering angle.

When the capacity of the regulating gas chamber 104L is reduced, the pressure in the regulating gas chamber 104L increases. The regulating gas chamber 104L is connected to the gas chamber 808L (the gas chamber 808 of the air shock absorber 8L) and therefore the pressure in the gas chamber 808L also increases. In other words, the gas chamber 808L is pressurized by the regulator 10. The reaction force of the air shock absorber 8L is based on the difference between the pressure in the gas chamber 807 and the pressure in the gas chamber 808L. Therefore, as the pressure in the gas chamber 808L increases, the reaction force of the air shock absorber 8L is lowered, so that the air shock absorber 8L shrinks.

On the other hand, the capacity of the regulating gas chamber 104R in the regulator 10 increases and the pressure in the regulating gas chamber 104R is reduced. The regulating gas chamber 104R is connected to the gas chamber 808R (the gas chamber 808 of the air shock absorber 8R), and therefore the pressure in the gas chamber 808R is also reduced. More specifically, the gas chamber 808R is decompressed by the regulator 10. As a result, the reaction force of the air shock absorber 8R provided on the opposite side to the steering direction of the handle 5 increases and the air shock absorber 8R expands.

Normally, when the rider steers the handle 5 to the left, a load concentrates on the air shock absorber 8R provided on the opposite side (outer side) to the steering direction of the handle 5 because of centrifugal force applied on the snowmobile 100. Therefore, the air shock absorber 8R acts to shrink and the air shock absorber 8L acts to expand. As a result, the vehicle body 1 during turning is inclined to the opposite side (outer side) to the steering direction of the handle 5.

However, in the snowmobile 100, the regulator 10 reduces the reaction force of the air shock absorber 8L and increases the reaction force of the air shock absorber 8R by an amount corresponding to the steering angle. Therefore, reaction force generated by centrifugal force caused by the turning and the reaction force controlled by the regulator 10 depending on the steering angle cancel each other. As a result, the vehicle body 1 during turning can be prevented from being inclined to the opposite side to the steering direction of the handle. In short, the rolling amount is reduced. The snowmobile 100 can also incline the vehicle body 1 to the steering side (inner side) of the handle 5 during turning.

As described above, the regulator 10 regulates the reaction force of each of the air shock absorber 8L and 8R depending on the amount of how much the handle is steered (steering angle). More specifically, as the steering angle increases, the reaction force of the air shock absorber 8L is reduced and the reaction force of the air shock absorber 8R is raised. Therefore, the snowmobile 100 can turn at higher speed.

In the snowmobile 100, the regulator gas chamber 104L in the regulator 10 is connected to the gas chamber 808L and the regulator gas chamber 104R is connected to the gas chamber 808R. The capacity of the gas chamber 808 of each air shock absorber 8 is smaller than the capacity of the gas chamber 807. Therefore, the pressure in the gas chamber 808 can be more greatly varied than the pressure in the gas chamber 807, and the reaction forces of the air shock absorbers 8L and 8R when the handle 5 is steered can be more greatly varied. As a result, the snow mobile 100 can have its vehicle body 1 inclined in a wider range. If the steering becomes heavy using the above-described structure, the snowmobile 100 is preferably provided with a power steering device. In this case, it is easier for the rider to operate the handle 5.

When Steering Handle to Right

When the rider steers the handle 5 to the right, the suspension mechanism 2 operates similarly to when the rider steers the handle 5 to the left.

When the handle 5 is steered to the right, the coupling member 151 in FIG. 5 is turned in the R-direction in FIG. 5. At the time, the regulating piston 103 moves to the side of the regulating gas chamber 104R. As a result, the capacity of the regulating gas chamber 104L increases and the capacity of the regulating gas chamber 104R is reduced. The gas chamber 808L is connected to the regulating gas chamber 104L and therefore the pressure in the gas chamber 808L is reduced. On the other hand, the pressure in the gas chamber 808R increases. Therefore, the reaction force of the air shock absorber 8R provided on the side of the steering direction of the handle 5 is reduced and the reaction force of the air shock absorber 8L on the opposite side increases. As a result, the rolling amount is reduced. The snowmobile 100 can actively incline the vehicle body 1 to the inner side while turning.

Second Preferred Embodiment

In the first preferred embodiment, the reaction forces of the air shock absorbers 8L and 8R are regulated as the regulating piston 103 and the handle 5 operate synchronously with each other. However, the above-described effect can be provided by other structures.

Figure 7:
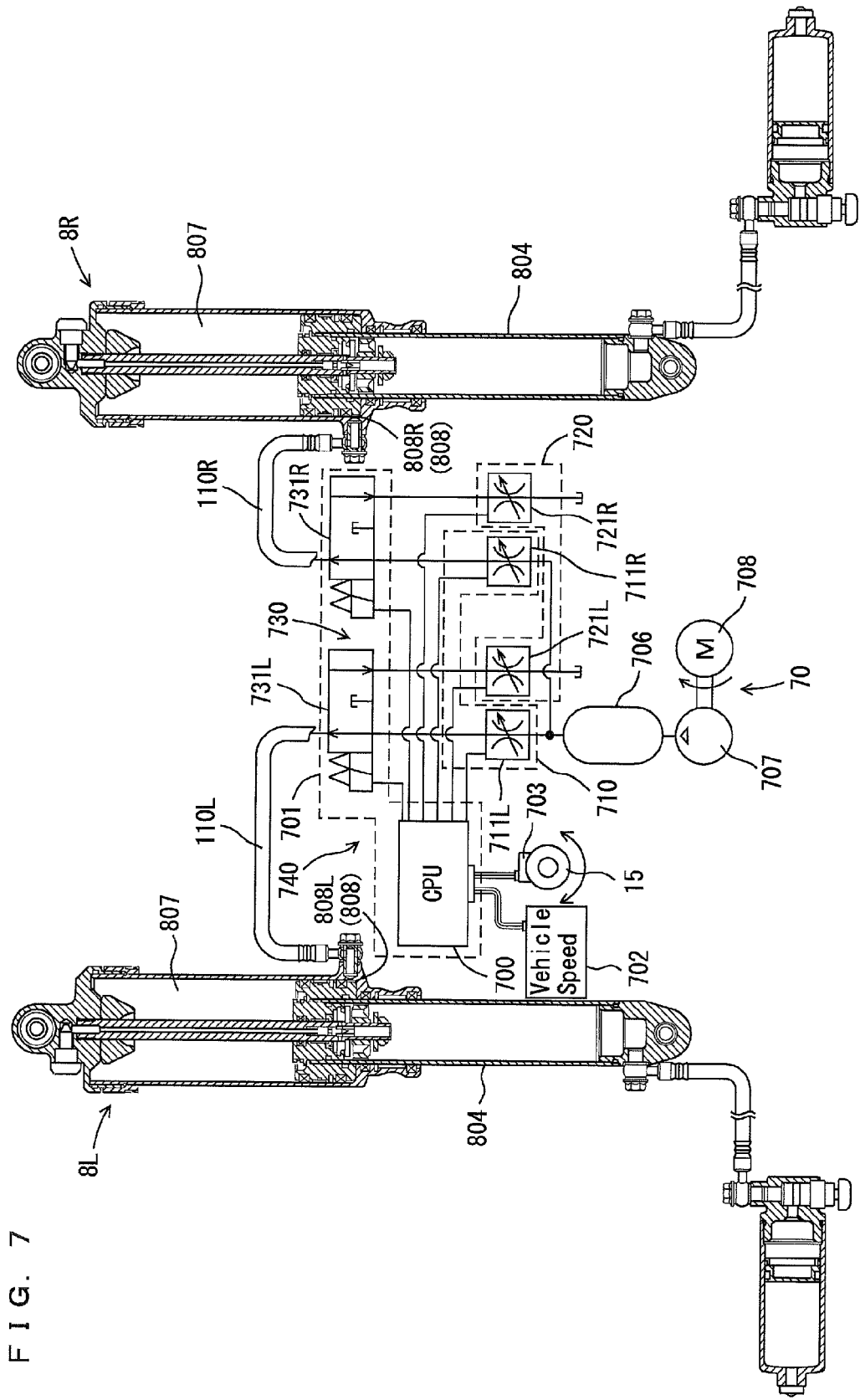
FIGS. 7 to 9 are views of suspension mechanisms according to second to fourth preferred embodiments of the invention, respectively.

Referring to FIG. 7, a snowmobile according to the present preferred embodiment includes a regulator 70 instead of the regulator 10. The regulator 70 includes an accumulator 706, a compressor 707, a motor 708, a vehicle speed sensor 702, a steering angle sensor 703, and a controller 740.

The compressor 707 is driven by the motor 708. The compressor 707 compresses intake gas (air in this example) and supplies the compressed gas to the accumulator 706. The accumulator 706 stores the compressed gas. The steering angle sensor 703 is attached to the steering shaft 15 and detects the steering direction and the steering angle. The vehicle speed sensor 702 detects the vehicle speed of the snowmobile 100 based on the rotation speed of the shaft that rotates the track belt 4.

The controller 740 supplies the compressed gas at a flow rate corresponding to the steering angle and the vehicle speed to the gas chamber 808 in the air shock absorber 8 provided on the same side as the steering direction of the handle 5 based on the detection results of the vehicle speed sensor 702 and the steering angle sensor 703. The controller 740 discharges the gas in the gas chamber 808 in the air shock absorber 8 provided on the opposite side to the outside at a flow rate corresponding to the steering angle and the vehicle speed.

The controller 740 includes an instruction device 701, a supply device 710, and an exhaust device 720. The supply device 710 includes variable throttles 711L and 711R. The variable throttle 711L is connected between the accumulator 706 and the gas hose 110L. The variable throttle 711R is connected between the accumulator 706 and the gas hose 110R. The gas hose 110L is connected to the gas chamber 808L and the gas hose 110R is connected to the gas chamber 808R. The supply device 710 adjusts the opening degree of the variable throttle 711L or 711R in response to a supply instruction from the instruction device 701 and supplies the gas chamber 808L or 808R with the compressed gas at a flow rate corresponding to the steering angle and the vehicle speed.

The exhaust device 720 includes variable throttles 721L and 721R. The variable throttle 721L is connected to the gas hose 110L. The variable throttle 721R is connected to the gas hose 110R. The exhaust device 720 adjusts the opening degree of the variable throttle 721L or 721R in response to an exhaust instruction from the instruction device 701 and discharges the gas in the gas chamber 808L or 808R at a flow rate corresponding to the steering angle and the vehicle speed.

The instruction device 701 includes a CPU (central processing unit) 700 and a switching device 730. The CPU 700 selects one to be controlled among the variable throttles 711L, 711R, 721L, and 721R based on the detection results of the vehicle speed sensor 702 and the steering angle sensor 703 and outputs a supply instruction or an exhaust instruction to the selected throttle. The CPU 700 further outputs a supply instruction or an exhaust instruction to the switching device 730 based on the detection results.

The switching device 730 includes electromagnetic valves 731L and 731R. The electromagnetic valves 731L is connected between the gas hose 110L and the variable throttles 711L and 721L. The electromagnetic valve 731R is connected between the gas hose 110R and the variable throttles 711R and 721R.

The electromagnetic valve 731L disconnects between the gas hose 110L and the variable throttles 711L and 721L when there is no instruction from the CPU 700. Upon receiving a supply instruction from the CPU 700, the electromagnetic valve 731L connects the variable throttle 711L to the gas hose 110L and disconnects between the variable throttle 721L and the gas hose 110L. On the other hand, upon receiving an exhaust instruction from the CPU 700, the electromagnetic valve 731L connects the variable throttle 721L to the gas hose 110L and disconnects between the gas hose 110L and the variable throttle 711L.

The electromagnetic valve 731R disconnects between the gas hose 110R and the variable throttles 711R and 721R when there is no instruction from the CPU 700. Upon receiving a supply instruction from the CPU 700, the electromagnetic valve 731R connects the variable throttle 711R to the gas hose 110R and disconnects between the gas hose 110R and the variable throttle 721R. On the other hand, upon receiving an exhaust instruction from the CPU 700, the electromagnetic valve 731R connects the variable throttle 721R to the gas hose 110R and disconnects between the gas hose 110R and the variable throttle 711R.

The regulator 70 described above operates as follows. When the snowmobile 100 including the regulator 70 instead of the regulator 10 advances straightforward, the variable throttles 711L, 711R, 721L, and 721R are all closed. The switching device 730 disconnects between the gas hoses 110L and 110R and between the supply device 710 and the exhaust device 720.

The vehicle speed sensor 702 and the steering angle sensor 703 detect the vehicle speed, the steering direction, and the steering angle for every prescribed period (such as 0.1 seconds) and inform the results to the instruction device 701. When the rider steers the handle 5 to the left, the CPU 700 in the instruction device 701 is informed of the results from the vehicle speed sensor 702 and the steering angle sensor 703 and determines that the handle 5 has been steered to the left.

The CPU 700 selects the variable throttles 711L and 721R as throttles to be controlled among the variable throttles 711L, 711R, 721L, and 721R. At the time, the CPU 700 selects the throttles to be controlled according to the steering direction.

Then, the CPU 700 determines the opening degrees of the variable throttle 711L and 721R based on the steering angle and the vehicle speed. For example, the regulator 70 stores a plurality of opening degrees for the variable throttles 711L and 711R corresponding to a plurality of steering angles and vehicle speeds in a memory that is not shown. The CPU 700 reads out an opening degree for the variable throttle 711L corresponding to a detected steering angle and a detected vehicle speed from the memory. Similarly, the CPU 700 reads out from the memory an opening degree for the variable throttle 721R corresponding to a detected steering angle and a detected vehicle speed.

Then, the CPU 700 outputs a supply instruction and an exhaust instruction to the switching device 730 based on the selected components to be controlled. More specifically, the CPU 700 outputs a supply instruction to the electromagnetic valve 731L and an exhaust instruction to the electromagnetic valve 731. The electromagnetic valve 731L connects the variable throttle valve 711L to the gas hose 110L in response to the supply instruction. On the other hand, the electromagnetic valve 731R connects the variable throttle 711R to the gas hose 110R.

The CPU 700 also outputs a supply instruction to the variable throttle 711L to open by a determined opening degree and an exhaust instruction to the variable throttle 721R to open by a determined degree. The variable throttle 711L opens by the determined opening degree in response to the supply instruction. In this way, the compressed gas from the accumulator 706 is supplied to the gas chamber 808L at a flow rate corresponding to the opening degree. Therefore, the pressure in the gas chamber 808L increases and the reaction force of the air shock absorber 8L is reduced, so that the air shock absorber 8L shrinks.

On the other hand, the variable throttle 721R opens by the determined degree in response to the exhaust instruction. In this way, the gas in the gas chamber 808R is discharged to the outside at a flow rate corresponding to the opening degree. Therefore, the pressure in the gas chamber 808R is reduced, so that the reaction force of the air shock absorber 8R increases and the air shock absorber 8R expands. Consequently, the regulator 70 can regulate the reaction forces of the air shock absorbers 8L and 8R according to the steering angle and can reduce the rolling amount during turning similarly to the first preferred embodiment.

When the handle 5 is steered to the right, the regulator 70 operates similarly to the leftward steering. More specifically, the instruction device 701 is informed of the results from the vehicle speed sensor 702 and the steering angle sensor 703 and determines that the handle 5 has been steered to the right.

At the time, the CPU 700 in the instruction device 701 selects the variable throttles 711R and 721L as components to be controlled based on the steering direction. The CPU 700 determines the opening degrees of the variable throttles 711R and 721L based on the steering angle and the vehicle speed.

The CPU 700 outputs an exhaust instruction to the electromagnetic valve 731L and a supply instruction to the electromagnetic valve 731R. At the time, the electromagnetic valve 731L connects the variable throttle 721L to the gas hose 110L. The electromagnetic valve 731R connects the variable throttle 711R to the gas hose 110R.

The CPU 700 further outputs a supply instruction and an exhaust instruction to open at the determined opening degrees to the variable throttle 711 and the variable throttle 721L.

The variable throttle 711R opens by the determined opening degree in response to the supply instruction. In this way, the compressed gas is supplied to the gas chamber 808R at a flow rate corresponding to the opening degree. Therefore, the air shock absorber 8R shrinks. The variable throttle 721L opens by the determined opening degree in response to the exhaust instruction. In this way, the reaction force of the air shock absorber 8L increases and the air shock absorber 8L expands. As a result, the rolling amount during turning can be reduced.

Third Preferred Embodiment

According to the first preferred embodiment, as shown in FIG. 5, the regulating gas chamber 104L is connected to the gas chamber 808L and the regulating gas chamber 104R is connected to the gas chamber 808R. However, the regulating gas chambers 104L and 104R may be connected to the gas chambers 807 of the air shock absorbers 8L and 8R.

Figure 8:
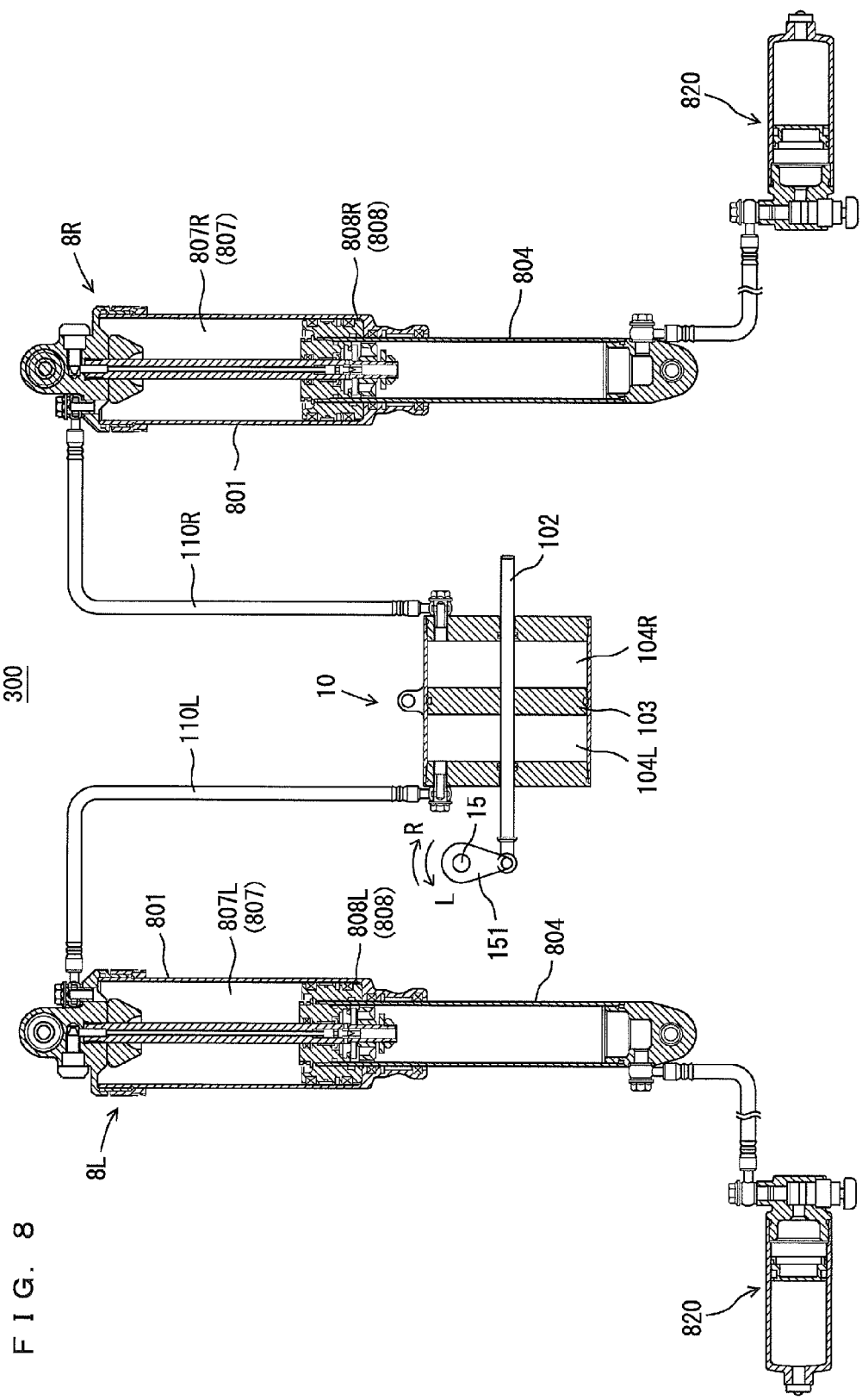

FIG. 8 shows the structure of a suspension mechanism 300 according to a third preferred embodiment of the invention. The suspension mechanism 300 includes the air shock absorbers 8L and 8R and the regulator 10 similarly to the mechanism in FIG. 5. However, the regulating gas chambers 104L and 104R are connected to different components from those in FIG. 5. More specifically, the regulating gas chamber 104L is connected to the gas chamber 807 of the air shock absorber 8L (hereinafter referred to as the "gas chamber 807L") through the gas hose 110L. The regulating gas chamber 104R is connected to the gas chamber 807 of the air shock absorber 8R (hereinafter referred to as the "gas chamber 807R") through the gas hose 110R.

Furthermore, the position of the steering shaft 15 relative to the piston rod 102 is different from that in FIG. 5. More specifically, in FIG. 5, the steering shaft 15 is provided under the piston rod 102 but in FIG. 8, it is provided above the piston rod 102.

The change in the position of the steering shaft 15 described above changes the operation of the regulating piston 103 when the handle 5 is steered. In FIG. 8, when the handle 5 is steered to the left (to the L-direction in FIG. 8), the piston rod 102 moves to the side of the regulating gas chamber 104R (to the right in FIG. 8). The structure of the suspension mechanism 300 other that the above is the same as that of the suspension mechanism 2.

The snowmobile 100 having the suspension mechanism 300 instead of the suspension mechanism 2 operates similarly to the first preferred embodiment. In the snowmobile 100 having the suspension mechanism 300, when the rider steers the handle 5 to the left, the regulating piston 103 in FIG. 8 moves a distance corresponding to the steering angle to the side of the regulating gas chamber 104R. As a result, the regulating gas chamber 104L expands and the regulating gas chamber 104R shrinks.

The gas chamber 807L is connected to the regulating gas chamber 104L. Therefore, the pressure in the gas chamber 807L is reduced in response to the expansion of the regulating gas chamber 104L. More specifically, the gas chamber 807 is decompressed. As a result, the air shock absorber 8L has its reaction force reduced by a value corresponding to the steering angle and shrinks.

On the other hand, the gas chamber 807R is connected to the regulating gas chamber 104R and therefore the pressure in the gas chamber 807R is raised. More specifically, the gas chamber 807R is pressurized. As a result, the air shock absorber 8R has its reaction force raised by a value corresponding to the steering angle and expands.

In short, the suspension mechanism 300 operates in the same manner as the suspension mechanism 2 and the same effect is provided. In the suspension mechanism 300, the pressure in the gas chamber 808 having a capacity greater than that of the gas chamber 807 is regulated. Therefore, as shown in FIG. 8, the regulating gas chambers 104L and 104R in the regulator 10 preferably have greater capacities than those in FIG. 5.

Fourth Preferred Embodiment

Using the regulator 70 according to the second preferred embodiment, the gas chambers 807L and 807R may be regulated instead of regulating the pressure in the gas chambers 808L and 808R.

Figure 9:
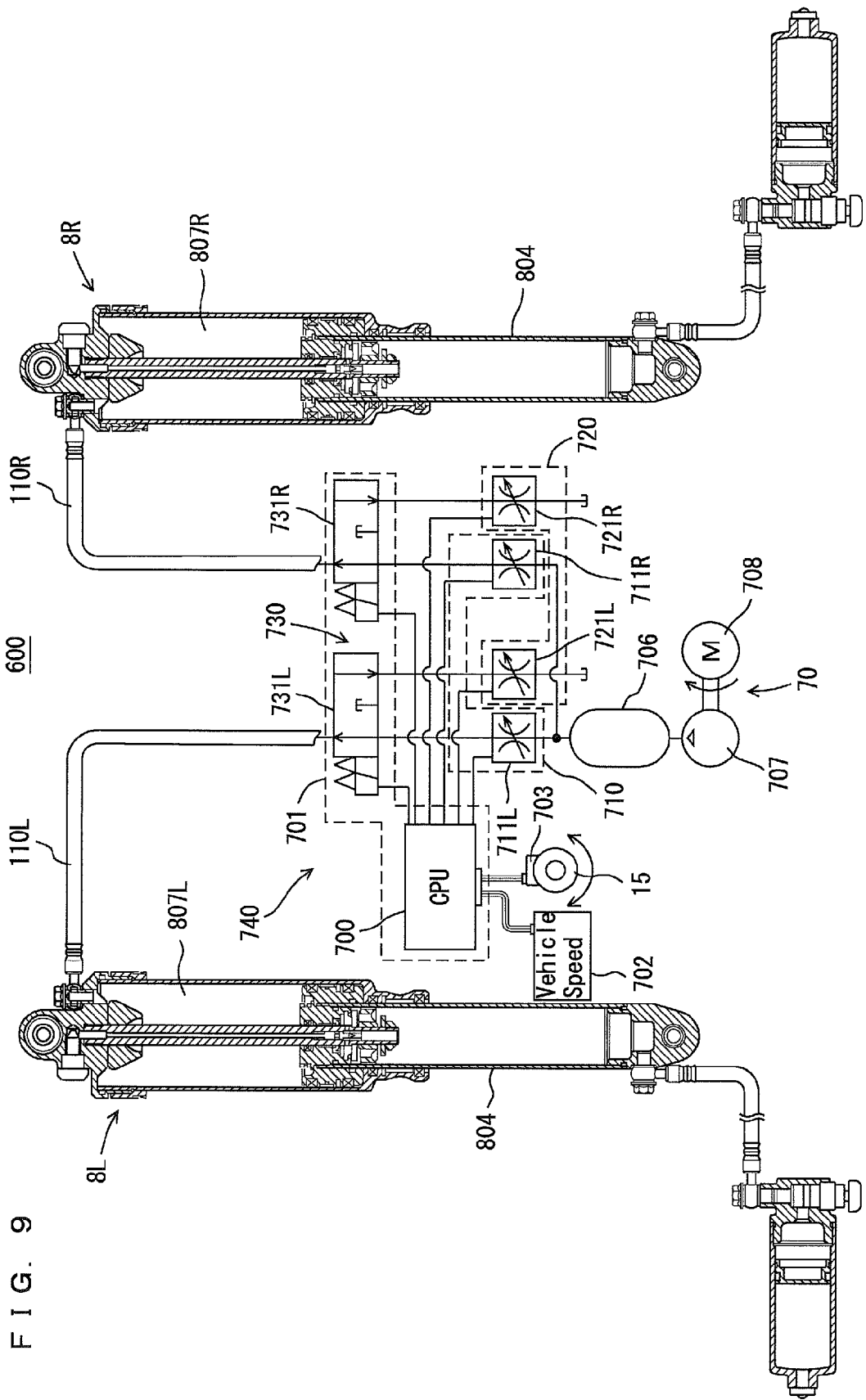

The structure of a suspension mechanism 600 according to a fourth preferred embodiment of the invention is shown in FIG. 9. Referring to FIG. 9, the supply device 710 and the exhaust device 720 are connected to different components from those in FIG. 7. More specifically, the gas hose 110L connects the gas chamber 807L and the supply device 710 and the exhaust device 720 instead of the gas chambers 808L. Similarly, the gas hose 110R connects the gas chamber 807R and the supply device 710 and the exhaust device 720 instead of the gas chamber 808R.

Since the gas hoses 110L and 110R are connected to the different components, the operation of the instruction device 701 is different from that in the second preferred embodiment. More specifically, the CPU 700 changes components to be selectively controlled (variable throttles 711L, 711R, 721L, and 721R) depending on the steering direction of the handle 5. Specific operation is as follows.

When the rider steers the handle 5 to the left, the CPU 700 determines that the handle 5 has been steered to the left in response to notification from the vehicle speed sensor 702 and the steering angle sensor 703.

At the time, the CPU 700 selects the variable throttles 711R and 721L as components to be controlled. The CPU 700 then determines the opening degrees of the variable throttles 711R and 721L based on the steering angle and the vehicle speed. The method of determining the opening degrees is the same as that in the second preferred embodiment.

Then, the CPU 700 outputs an exhaust instruction to the electromagnetic valve 731L in the switching device 730 and outputs a supply instruction to the electromagnetic valve 731R. In this way, the electromagnetic valve 731L connects the variable throttle 721L to the gas hose 110L and the electromagnetic valve 731R connects the variable throttle 711R to the gas hose 110R.

The CPU 700 also outputs a supply instruction and an exhaust instruction to open at determined opening degrees to the variable throttles 711R and 721R. The variable throttle 711R opens the valve by the determined opening degree in response to the supply instruction. In this way, compressed gas is supplied to the gas chamber 807R at a flow rate corresponding to the opening degree. Therefore, the reaction force of the air shock absorber 8R increases and the air shock absorber 8R expands. On the other hand, the variable throttle 721L opens by the determined opening degree. In this way, the gas in the gas chamber 807L is discharged to the outside at a flow rate corresponding to the opening degree. Therefore, the reaction force of the air shock absorber 8L is reduced and the air shock absorber 8L shrinks. As a result, the reaction forces of the air shock absorbers 8L and 8R are changed depending on the steering angle, and the rolling amount during turning is reduced according to the steering angle.

On the other hand, when the handle 5 is steered to the right, the CPU 700 selects the variable throttles 711L and 721R as components to be controlled. The CPU 700 determines the opening degrees of the variable throttle 711L and the variable throttle 721R based on the steering angle and the vehicle speed. The CPU 700 controls the switching device 730 to connect the variable throttle 711L to the gas hose 110L and the variable throttle 721R to the gas hose 110R. The CPU then outputs a supply instruction and an exhaust instruction to open by the determined opening degrees to the variable throttles 711L and 721R. As a result, similarly to the above, the reaction force of the air shock absorber 8L increases and the reaction force of the air shock absorber 8R are reduced.

Fifth Preferred Embodiment

Normally, the snowmobile 100 does not travel on a paved road surface but on a bumpy road with snow. If for example the handle 5 is turned to the left or right even slightly because of irregularities on the road surface and the reaction forces of the air shock absorbers 8L and 8R are changed, the riding comfort of the vehicle is impaired. When the handle 5 turns only slightly to the right or left, the reaction forces of air shock absorbers 8L and 8R are preferably kept from being regulated.

Figure 10:
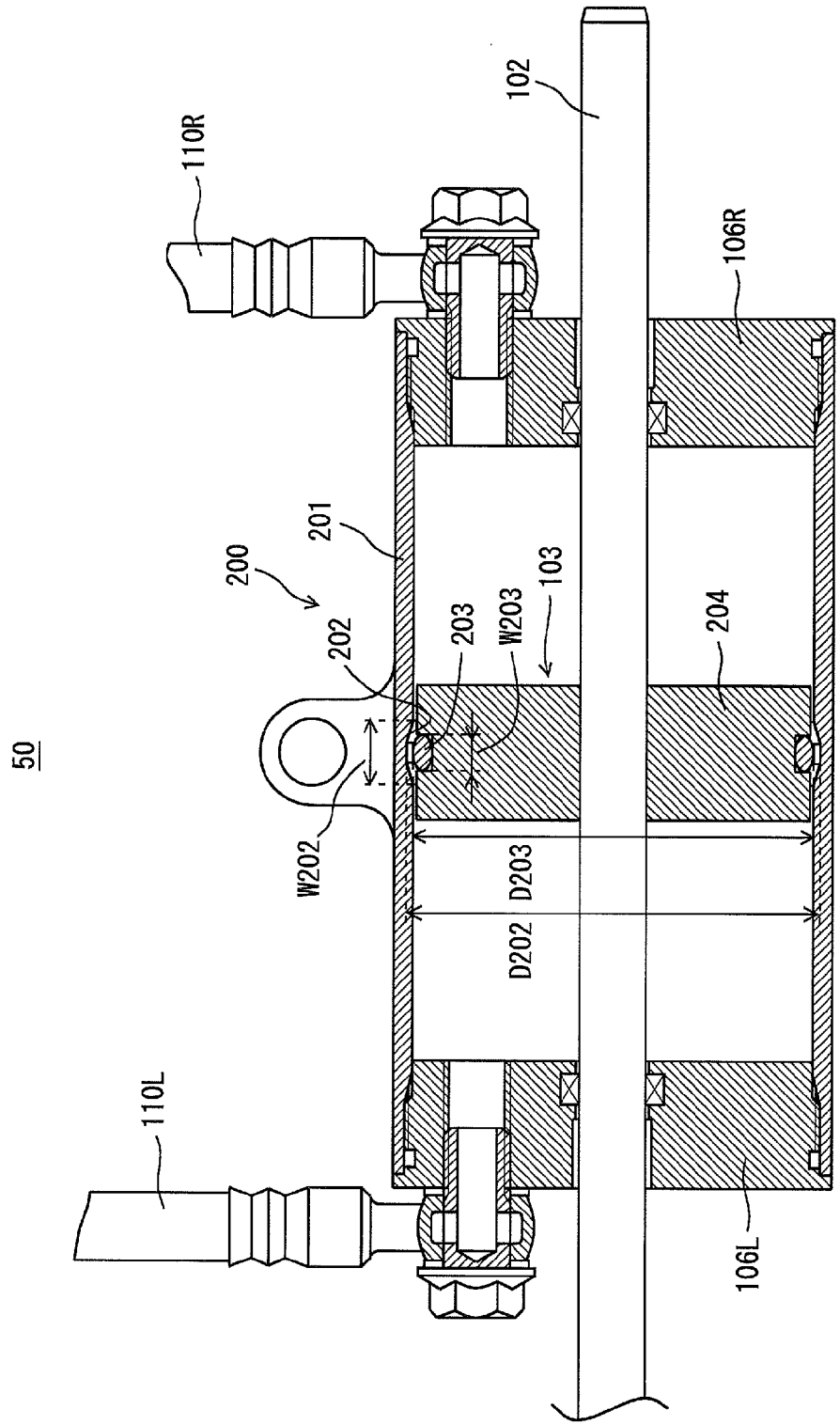
FIG. 10 is a sectional view of a regulator according to a fifth preferred embodiment of the present invention.

The snowmobile according to the present preferred embodiment includes a regulator 50 shown in FIG. 10. The other structure is the same as that of the first or third preferred embodiment.

Referring to FIG. 10, the regulator 50 includes a new regulating cylinder 200 instead of the regulating cylinder 101. The regulating cylinder 200 includes a cylindrical body 201 and lids 106L and 106R. The cylindrical member 201 has a groove 202 at the inner circumferential surface in a position opposed to the outer circumferential surface of the regulating piston 103 arranged when the steering angle is 0°. The groove extends in the circumferential direction. In this example, the cylindrical member 201 has the groove 202 in the center of the inner circumferential surface.

The regulating piston 103 includes a piston main body 204 and a piston ring 203. The piston ring 203 is attached to the outer circumferential surface of the piston main body 204. The piston ring 203 is for example made of an elastic member such as resin. The piston ring 203 has a width W203 that is smaller than the width W202 of the groove 202. The outer diameter D203 of the piston ring 203 is smaller than the inner diameter D202 of the cylindrical member 201 at the bottom of the groove 202 and larger than the inner diameter of the cylindrical member 201 at the inner surface other than at the groove 202.

When the steering angle is 0°, in other words, when the snowmobile 100 advances straightforward, the piston ring 203 is provided in a position opposed to the groove 202. At the time, the width of the piston ring 203 is smaller than the width of the groove 202 and therefore the regulating gas chambers 104L and 104R are connected through the groove 202. Therefore, when the regulating piston 103 is moved slightly to the left or right because of the shaking of the handle 5, the reaction forces of the air shock absorbers 8L and 8R do not change. In short, the groove 202 serves as an "allowance."

Sixth Preferred Embodiment

Figure 11:
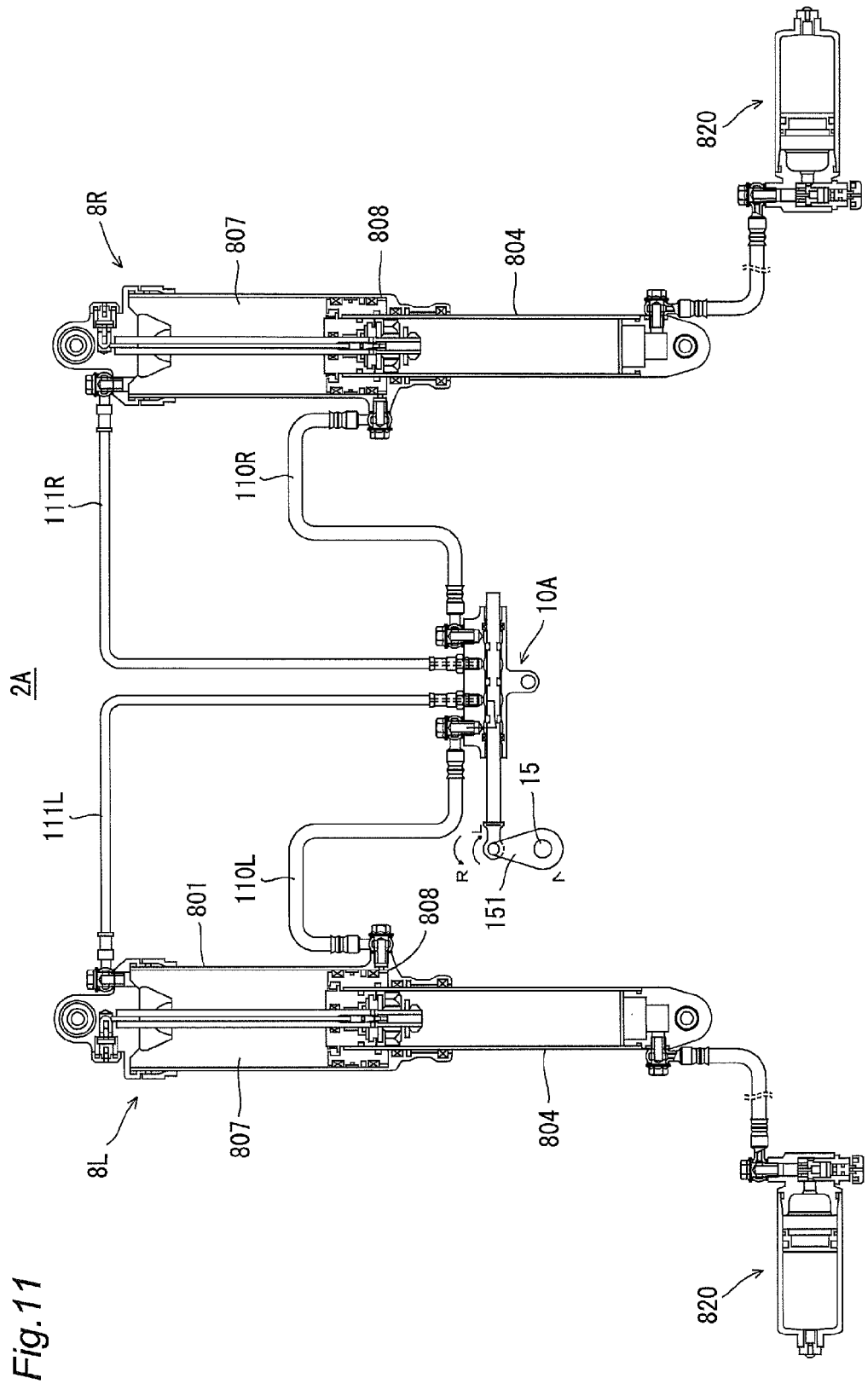
FIG. 11 is a view of the structure of a suspension mechanism according to a sixth preferred embodiment of the invention.

A snowmobile according to a sixth preferred embodiment of the invention includes a suspension mechanism 2A shown in FIG. 11. The other structure of the snowmobile is the same as that of the snowmobile 100. The suspension mechanism 2A includes air shock absorbers 8L and 8R and a regulator 10A. The regulator 10A connects/disconnects gas chambers 807 and 808 in the shock absorber 8L. The regulator 10A also connects/disconnects gas chambers 807 and 808 in the air shock absorber 8R.

Figure 12:
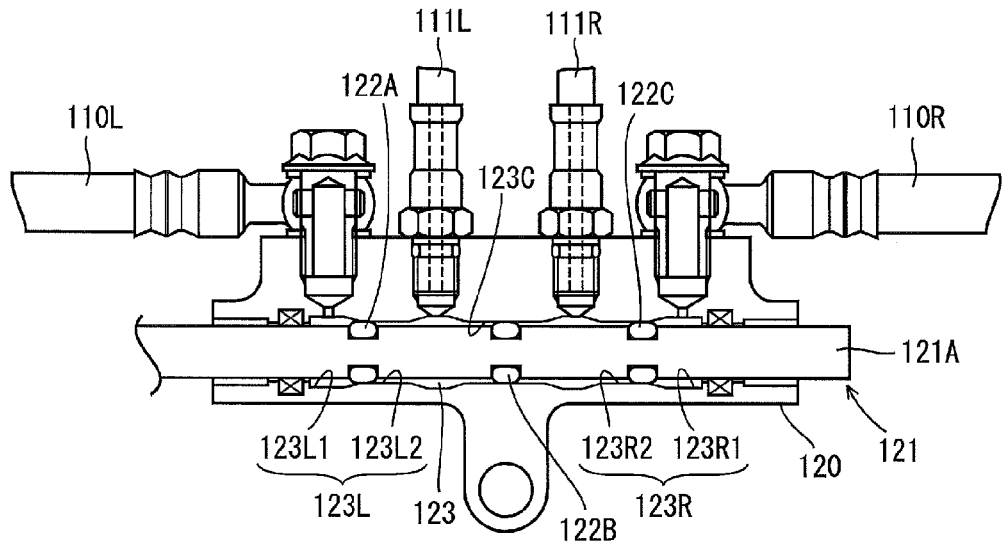
FIG. 12 is a sectional view of a regulator in FIG. 11.
Figure 13:
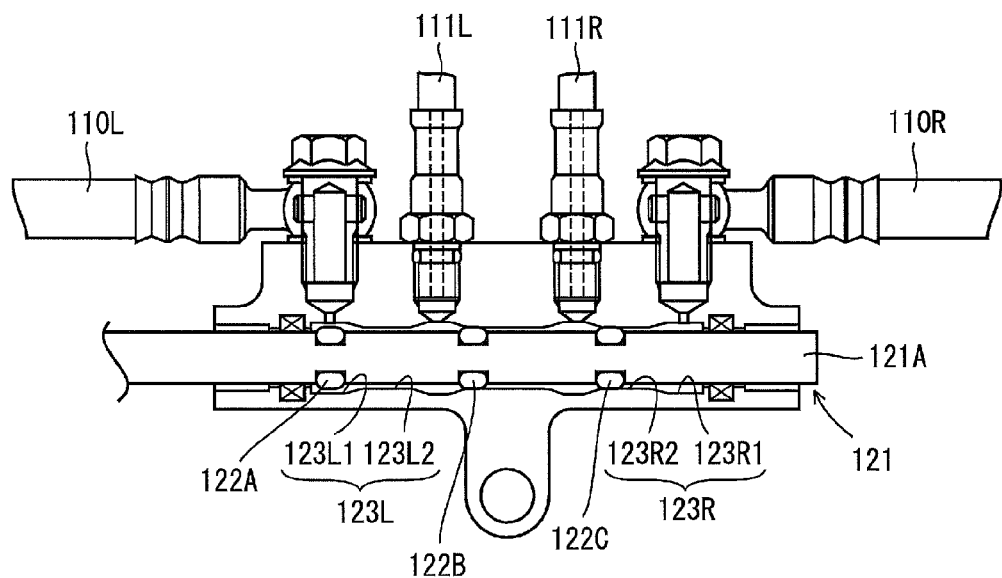
FIG. 13 is a sectional view of the regulator when a handle is steered to the left.

FIG. 12 is a sectional view of the regulator 10A in FIG. 11. As shown in FIG. 12, the regulator 10A includes a valve box 120 and a valve element 121. The valve box 120 has an inner path 123. The path 123 includes paths 123L, 123R, and 123C. The paths 123L, 123R, and 123C are coaxially provided. The path 123C is provided between the paths 123L and 123R.

The path 123L connects the gas chambers 807 and 808 in the air shock absorber 8L. The path 123L has paths 123L1 and 123L2. The path 123L1 is provided coaxially to the path 123L2. The path 123L2 is provided closer to the path 123C than the path 123L1. Referring to FIGS. 11 and 12, the path 123L2 is connected to the gas chamber 807 in the air shock absorber 8L through a gas hose 111L. The path 123L1 is connected to the gas chamber 808 of the air shock absorber 8L through a gas hose 110L. The path 123L2 has a portion whose inner diameter is smaller than the inner diameter of the path 123R1.

The path 123R connects the gas chambers 807 and 808 in the air shock absorber 8R. The path 123R has paths 123R1 and 123R2 similarly to the path 123L. The path 123R1 is provided coaxially to the path 123R2. The path 123R2 is provided closer to the path 123C than the path 123R1. Referring to FIGS. 11 and 12, the path 123R2 is connected to the gas chamber 807 in the air shock absorber 8R through a gas hose 111R. The path 123R1 is connected to the gas chamber 808 in the air shock absorber 8R through a gas hose 110R. The path 123R2 has a portion whose inner diameter is smaller than that of the path 123R1.

The valve element 121 includes a shaft 121A and seal members 122A to 122C. The shaft 121A is inserted into the path 123. A coupling member 151 is rotatably coupled to one end of the shaft 121A. As described above, the coupling member 151 is attached to the steering shaft 15. Therefore, the shaft 121A operates synchronously with the rotation of the handle 5 through the steering shaft 15. The outer diameter of the shaft 121A is smaller than the minimum inner diameter of the path 123.

The seal members 122A to 123C are ring-shaped and attached to the outer circumference of the shaft 121A. The seal members 122A to 123C are provided coaxially to the shaft 121A. The seal members 122A to 122C are made of an elastic material. The elastic material is for example rubber or synthetic resin.

The seal member 122A is provided in the path 123L. The outer diameter of the seal member 122A is smaller than the inner diameter of the path 123L1 and larger than the minimum inner diameter of the path 123L2. Therefore, when the sliding of the shaft 121A causes the seal member 122A to move into the path 123L2, the seal member 122A blocks the path 123L2. In other words, in this case, the seal member 122A closes the path 123L. The sliding of the shaft 121A causes the seal member 122A to move into the path 123L1, the seal member 122A releases the sealing of the path 123L2. More specifically, the seal member 122A opens the path 123L in this case.

The seal member 122C is provided in the path 123R. The outer diameter of the seal member 122C is smaller than the inner diameter of the path 123R1 and larger than the minimum inner diameter of the path 123R2. Therefore, when the sliding of the shaft 121A causes the seal member 123C to move into the path 123R2, the seal member 122C closes the path 123R. When the sliding of the shaft 121A causes the seal member 122C to move into the path 123R1, the seal member 122C opens the path 123R.

The seal member 122B is provided in the path 123C. The outer diameter of the seal member 122B is larger than the inner diameter of the path 123C. When the shaft 121A slides, the seal member 122B moves in the path 123C but does not move outside the path 123C. Therefore, the seal member 122B always blocks the path 123C.

Operation of Suspension Mechanism 2A

When the vehicle advances straightforward, the regulator 10A of the suspension mechanism 2A closes the paths 123L and 123R. Therefore, the gas chambers 807 and 808 in each of the air shock absorbers 8L and 8R are not connected to each other. Therefore, the reaction forces of the air shock absorber 8L and 8R are not affected by the regulator 10A.

On the other hand, when the handle 5 is steered to the left, the regulator 10A opens the path 123L while keeping the path 123R closed. When the handle 5 is steered to the right, the regulator 10A opens the path 123R while keeping the path 123L closed. Therefore, the pressure in the gas chambers 807 and 808 in the air shock absorbers 8L and 8R is regulated, so that the reaction forces of the air shock absorbers 8L and 8R are regulated. This will be detailed in the following.

When Advancing Straightforward

As shown in FIG. 12, when the snowmobile advances straightforward, the seal member 122A is placed in the path 123L2, the seal member 122B is placed in the path 123C, and the seal member 122C is placed in the path 123R2. Therefore, when the snowmobile advances straightforward, the paths 123L and 123R are closed and the reaction forces of the absorbers 8L and 8R are not affected by the regulator 10A.

When Steering Handle to Left

Assume that the rider of the snowmobile steers the handle 5 to the left. At the time, the coupling member 151 in FIG. 11 rotates in the direction of L in FIG. 11, and therefore the shaft 121A moves to the left from the position in FIG. 12. When the handle 5 is steered further to the left, and the steering angle becomes at least as large as a reference angle, the seal member 122A is placed in the path 123L1 as shown in FIG. 3. The reference angle can be determined as required depending on the arrangement position and length of the path 123L2. At the time, the seal member 122C is still in the path 123R2.

When the seal member 122A is placed in the path 123L1, the path 123L is opened. Therefore, the gas chamber 807 in the air shock absorber 8L is connected to the gas chamber 808, so that the reaction force of the air shock absorber 8L is lower than that during straightforward travel. On the other hand, the reaction force of the air shock absorber 8R is the same as that during straightforward travel.

Figure 14:
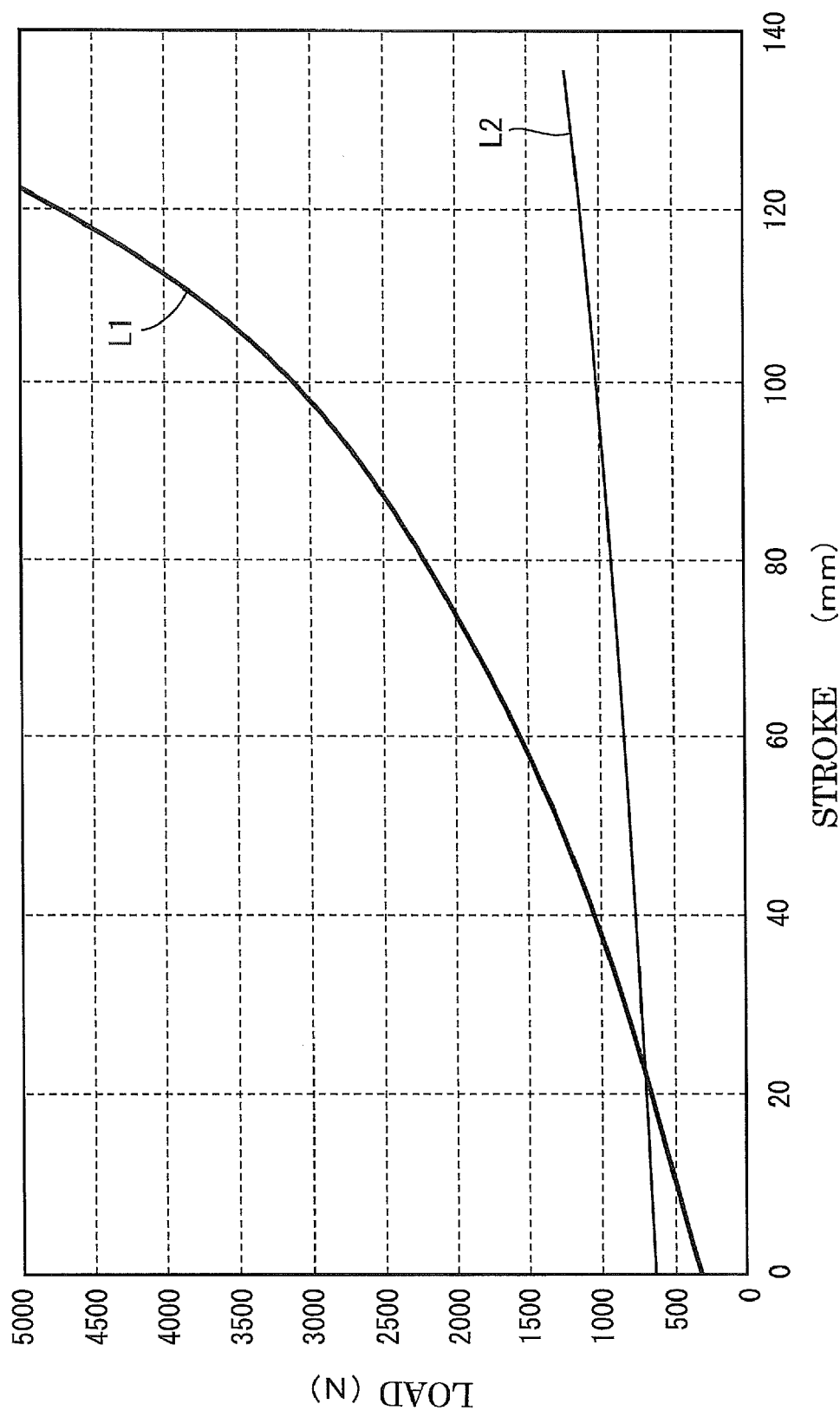
FIG. 14 is a graph showing the reaction force characteristic of an air suspension in the suspension mechanism shown in FIG. 11.

FIG. 14 is a graph showing the reaction force characteristic of the air shock absorbers 8L and 8R. The abscissa in FIG. 14 represents the stroke (mm) of an air shock absorber. When the stroke equals 0 mm, the air shock absorber is fully expanded. More specifically, as the stroke increases, the air shock absorber is more shrunk. The ordinate represents a load (N) necessary for a desired stroke to be attained. The curve L1 in FIG. 14 represents the reaction force characteristic of the air shock absorbers 8L and 8R when the gas chamber 807 is not connected to the gas chamber 808. The curve L2 represents the reaction force characteristic of the air shock absorbers 8L and 8R when the gas chamber 807 is connected to the gas chamber 808. The result in FIG. 14 was obtained by simulation. Referring to FIG. 14, during straightforward travel, the air shock absorbers 8L and 8R both have the reaction characteristic indicated by the curve L1. On the other hand, when the handle 5 is steered to the left, the air shock absorber 8R has the reaction force characteristic indicated by the curve L1, while the air shock absorber 8L has the reaction force characteristic indicated by the curve L2. More specifically, the reaction force of the air shock absorber 8L becomes lower than the reaction force of the air shock absorber 8R. Therefore, under a load, the air shock absorber 8R less easily shrinks and the air shock absorber 8L more easily shrinks.

As a result, when the handle 5 is steered to the left, reaction force generated by centrifugal force caused by turning is cancelled by reaction force controlled by the regulator 10A in response to the steering of the handle 5. Consequently, the snowmobile while turning can be prevented from being inclined to the side opposite to the steering direction of the handle 5. In short, the roll amount is reduced.

When Steering Handle to Right

When the rider steers the handle 5 to the right, the suspension mechanism 2A operates similarly to when the rider steers the handle 5 to the left.

When the handle 5 is steered to the right, the shaft 121A in FIG. 12 moves to the right. When the handle 5 is steered further to the right, and the steering angle is a reference angle or more as a result, the seal member 122C moves from the path 123R2 to the path 123R1. As described above, the reference angle can be set as desired depending on the arrangement position and length of the path 123R2.

When the seal member 122C moves to the path 123R1, the seal member 122A is still in the path 123L2, and the seal member 122B is still in the path 123C. Therefore, the path 123R is opened, and the path 123L is kept closed. As a result, the reaction force of the air shock absorber 8L is maintained, while the reaction force of the air shock absorber 8R is lowered. Therefore, the roll amount is reduced.

As in the foregoing, the regulator 10A serves as a valve to connect/disconnect the gas chambers 807 and 808 in each of the air shock absorbers 8L and 8R. The regulator 10A regulates the reaction force of each of the air shock absorbers 8L and 8R, so that the roll amount of the snowmobile during turning can be reduced.

In this example, the inner diameter of the path 123L1 is larger than the inner diameter of a part of the path 143L2. However, the inner diameter of the path 123L1 may be smaller than the inner diameter of the path 123L2. The regulator 10A needs only be formed so that the seal member 122A moves to a path having a larger inner diameter from a path having a smaller diameter in the path 123L when the handle 5 is steered to the left. Furthermore, the gas hose 111L may be connected to the path 123L instead of the gas hose 110L, and the gas hose 110L may be connected to the path 123L2 instead of the gas holes 111L. In short, the regulator 10C needs only be formed so that the gas chambers 807 and 808 in the air shock absorber on the same side as the turning direction of the vehicle to the same side as the steering direction of the handle 5 are connected to each other.

Seventh Preferred Embodiment

The structure of the regulator that serves as a valve is not limited to that of the regulator 10A. A snowmobile according to a seventh preferred embodiment of the invention includes a suspension mechanism 2B shown in FIG. 15. The other structure of the snowmobile is the same as that of the snowmobile 100. The suspension mechanism 2B is different from the suspension mechanism 2A in that it has a regulator 10B instead of the regulator 10A. The regulator 10B connects/disconnects the gas chambers 807 and 808 in each of the air shock absorbers 8L and 8R similarly to the regulator 10A.

Figure 15:
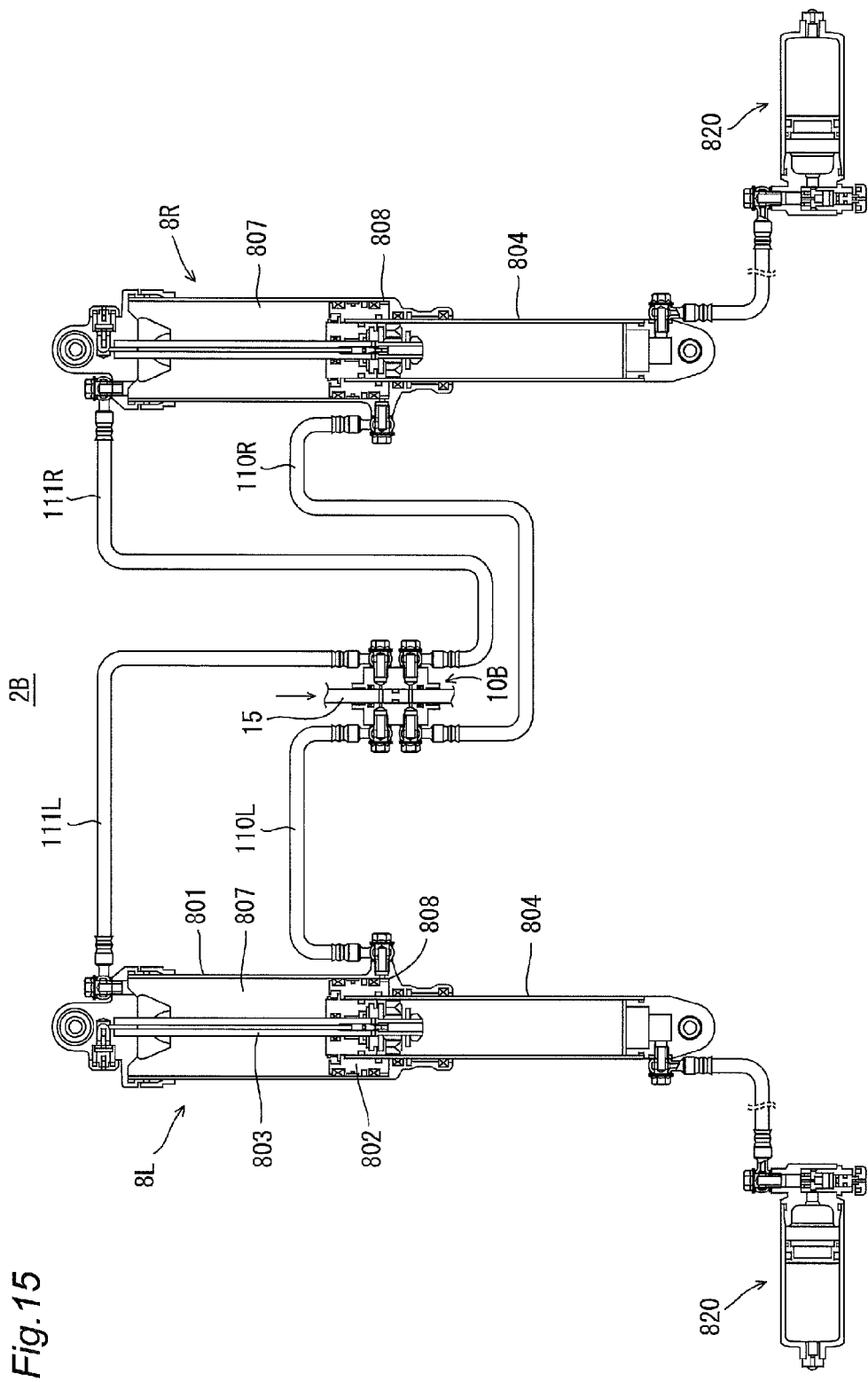
FIG. 15 is a view of the structure of a suspension mechanism according to a seventh preferred embodiment of the invention.
Figure 16:
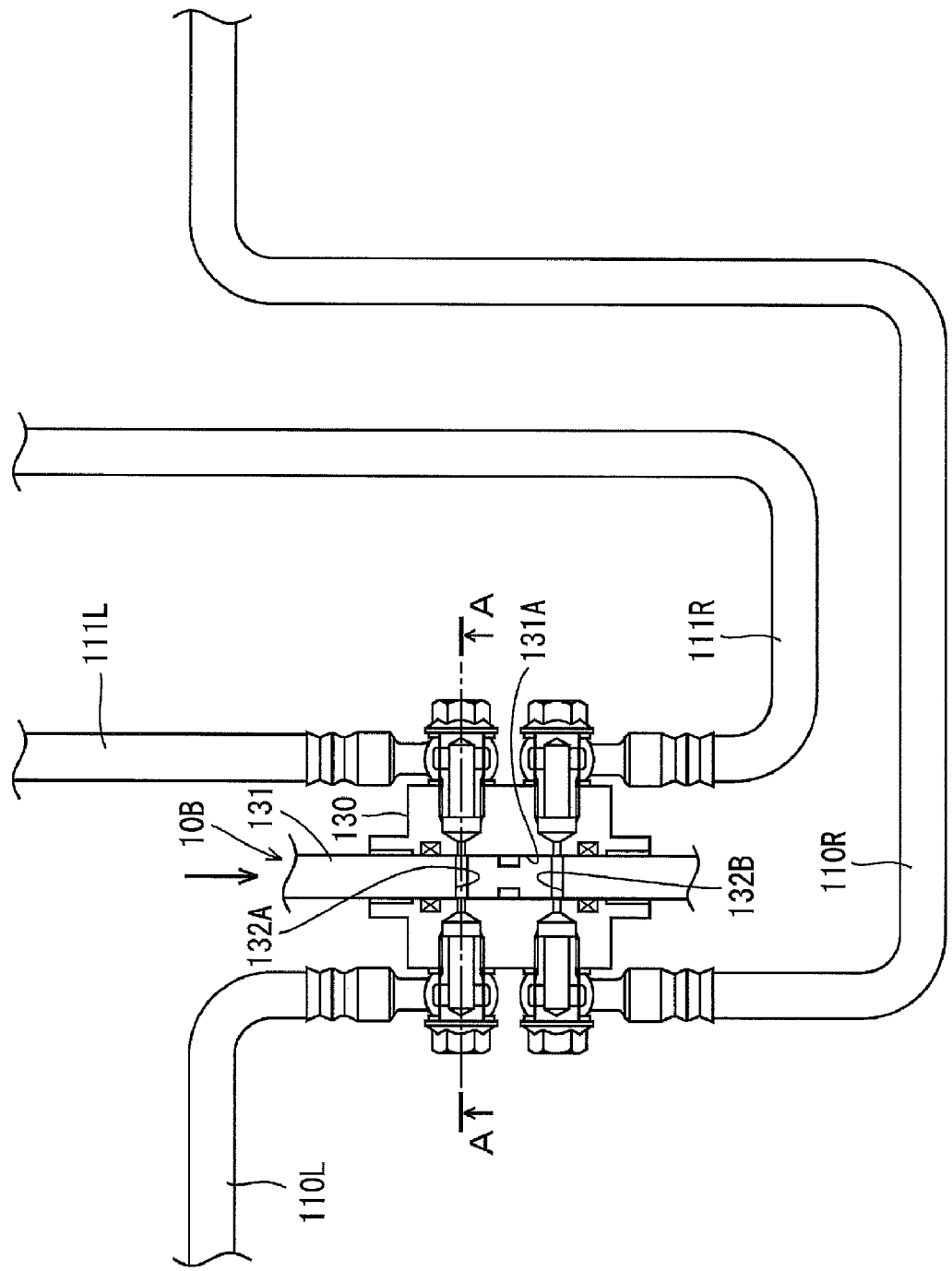
FIG. 16 is a sectional view of a regulator in FIG. 15.

FIG. 16 is a view of the peripheral structure of the regulator 10B in FIG. 15. Referring to FIG. 16, the regulator 10B includes a valve box 130 and a valve element 131. The valve box 130 has an insert hole 131A. The tip ends of the gas hoses 111L and 110L each have an opening connected to the insert hole 131A. The tip ends of the gas hoses 111R and 110R each have an opening connected to the insert hole 131A.

The valve box 131 is a steering shaft. More specifically, the snowmobile according to the present preferred embodiment includes the valve element 131 instead of the steering shaft 15 of the snowmobile 100. The valve element 131 is inserted in the insert hole 131A. The valve element 131 is supported rotatably around the central axis of the valve element 131 in the insert hole 131A. The handle 5 is attached to the upper end of the valve element 131.

The valve element 131 has paths 132A and 132B. The 132A and 132B are through holes that cross the central axis of the valve element 131. Therefore, the path 132A has two openings at the outer circumferential surface of the valve element 131 and the path 132B has two openings at the outer circumferential surface of the valve element 131. In this example, the paths 132A and 132B are orthogonal to the central axis of the valve element 131. The paths 132A and 132B do not cross each other when viewed from the side of the valve element 131 and cross each other when viewed in the direction of the central axis of the vehicle body 131.

Figure 17:
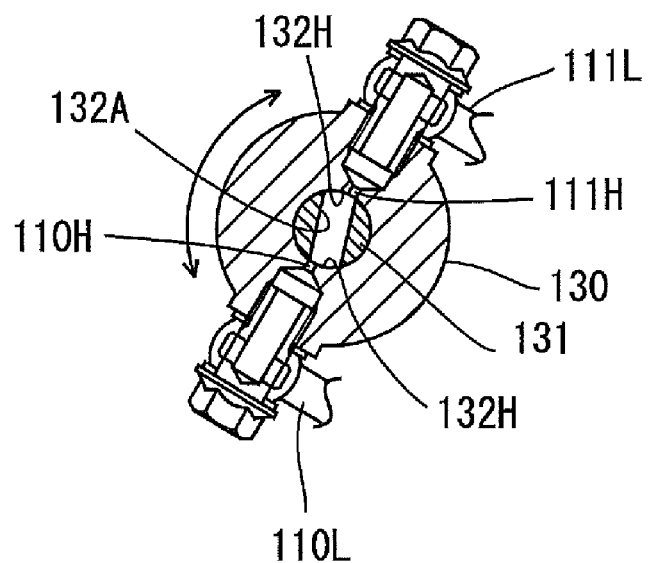
FIG. 17 is a sectional view taken along line A-A in FIG. 16.
Figure 18:
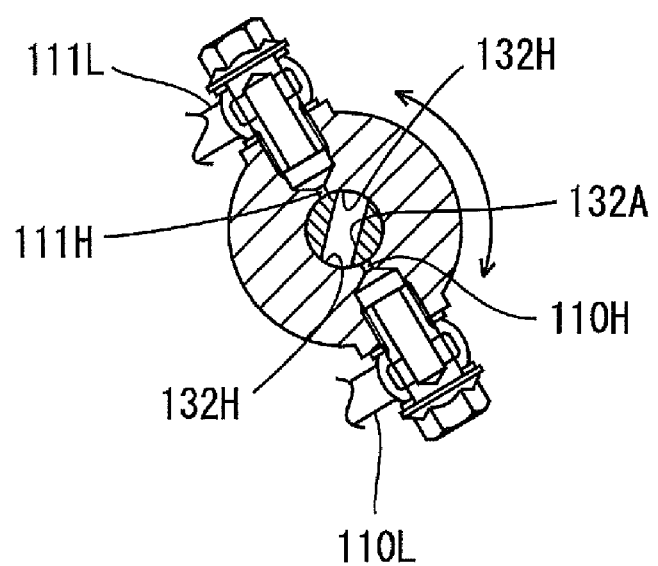
FIG. 18 is a sectional view taken along line A-A in FIG. 16 when a handle is steered.

The valve element 131 is a steering shaft. Therefore, when the handle 5 is steered to the left/right, the valve element 131 turns to the left/right. FIGS. 17 and 18 are sectional views taken along line A-A in FIG. 16. As shown in FIG. 17, when one opening 132H of the path 132A in the valve element 131 overlaps the opening 110H at the tip end of the gas hose 110L and the other opening 132H of the path 132A overlaps the opening 110H at the tip end of the gas hose 111L, the path 132A is opened and the gas chamber 807 is connected to the gas chamber 808 in the air shock absorber 8L.

On the other hand, as the result of the turning of the valve element 131, when one opening 132H of the path 132A does not overlap the opening 110H and the other opening 132H does not overlap opening 111H as shown in FIG. 18, the path 132A is closed and the gas chamber 807 in the air shock absorber 8L is disconnected from the gas chamber 808.

Operation of Suspension Mechanism 2B

The regulator 10B of the suspension mechanism 2B regulates the reaction force difference between the air shock absorbers 8L and 8R depending on a steering angle similarly to the regulator 10A. Now, the operation of the suspension mechanism 2B will be described in detail.

When Advancing Straightforward

When the snowmobile advances straightforward, the positional relation among the paths 132A and 132B and the gas hoses 111L, 110L, 111L, and 111R is the same as that in FIG. 17. More specifically, the two openings 132H of the path 132A overlap the opening 111H of the gas hose 111L and the opening 110H of the gas hoses 110L, and the two openings 132H of the path 132B overlap the opening 111H of the gas hose 111R and the opening 110H of the gas hose 110R. Therefore, the paths 132A and 132B are opened and the gas chamber 807 is connected to the gas chamber 808 in each of the shock absorbers 8L and 8R.

When Steering Handle to Left or Right

When the handle 5 is steered to the left, the valve element 131 rotates. Therefore, the openings 132H of the paths 132A and 132B rotate. When the steering angle becomes at least as large as a reference angle, the openings 132H of the path 132B are closed as they are shifted from the opening 110H of the gas hose 110R and the opening 111H of the gas hose 111R as shown in FIG. 18. On the other hand, the path 132A is kept open as shown in FIG. 17. The reference angle can be set as desired depending on the widths of the paths 132A and 132B as well as the crossed axes angle between them.

When the path 132B is closed as the path 132 is open, the gas chambers 807 and 808 in the air shock absorber 8L are kept connected, while the gas chambers 807 and 808 in the air shock absorber 8R are disconnected from each other. Therefore, the reaction force of the air shock absorber 8R is raised as compared to the reaction force of the air shock absorber 8L. In this way, the roll amount is reduced when the snowmobile turns to the left.

On the other hand, when the handle 5 of the snowmobile is steered to the right while the vehicle advances straightforward and the steering angle becomes at least as large as the reference angle, the path 132A is closed as shown in FIG. 18 and the path 132B is kept open as shown in FIG. 17. In this way, the gas chambers 807 and 808 in the air shock absorber 8R are still connected, while the gas chambers 807 and 808 in the air shock absorber 8L are disconnected from each other. Therefore, the reaction force of the air shock absorber 8L is raised as compared to the reaction force of the air shock absorber 8R. In this way, the roll amount is reduced when the snowmobile is turned to the right.

Eighth Preferred Embodiment

According to the seventh preferred embodiment, in the pair of air shock absorbers 8L and 8R, the gas chambers 807 and 808 in the air shock absorber on the opposite side to the steering direction of the handle 5 are disconnected, and the gas chambers 807 and 808 in the air shock absorber on the same side as the steering direction of the handle 5 are kept connected. However, the gas chambers 807 and 808 may be disconnected in any of the pair of air shock absorbers 8L and 8R when the handle 5 is steered to the left/right.

The structure of the snowmobile according to an eighth preferred embodiment of the invention is different from the structure of the snowmobile according to the seventh preferred embodiment only in the arrangement of the paths 132A and 132B. According to the eighth preferred embodiment, when the snowmobile advances straightforward, the paths 132A and 132B are open similarly to the sixth preferred embodiment. Therefore, the gas chambers 807 and 808 are connected to each other in the air shock absorbers 8L and 8R.

Figure 19:
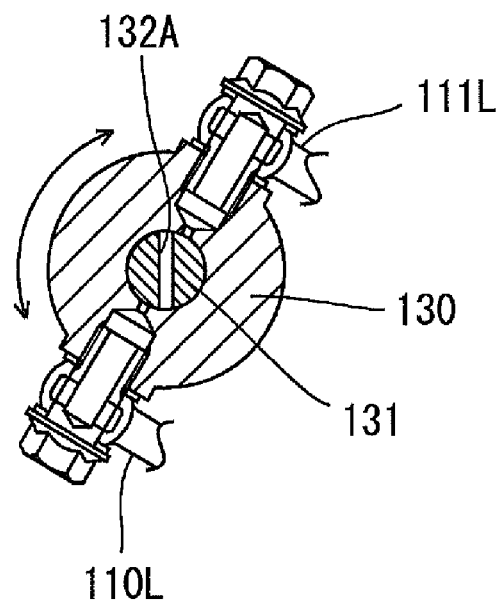
FIG. 19 is a sectional view of a part of a regulator according to an eighth preferred embodiment of the invention.
Figure 20:
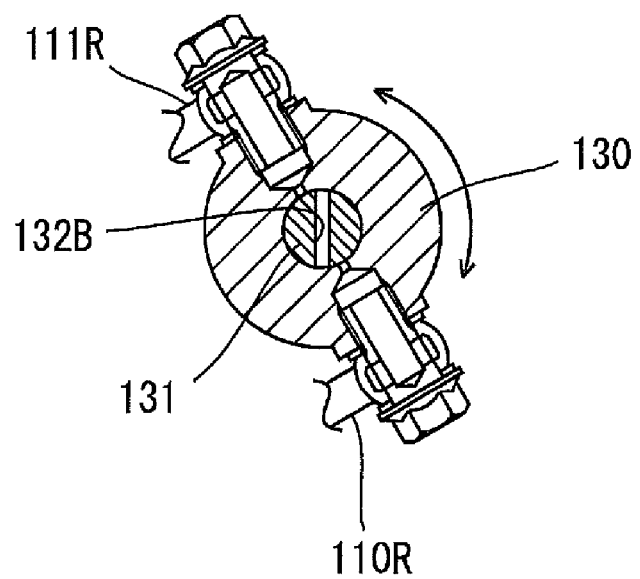
FIG. 20 is a sectional view of another part of the regulator according to the eighth preferred embodiment.

On the other hand, when the handle 5 is steered to the left or right and the steering angle becomes at least as large as the reference angle, the rotation of the valve element 131 closes the path 132A as shown in FIG. 19 and the path 132B is closed as shown in FIG. 20. At the time, in each of the air shock absorbers 8L and 8R, the gas chamber 807 is disconnected from the gas chamber 808, and therefore, the reaction force of each of the air shock absorbers 8L and 8R is raised.

In short, when the handle 5 is steered to the left/right, the reaction forces of the air shock absorbers 8L and 8R are both raised. Therefore, the air shock absorbers 8L and 8R are neither easily expanded nor shrunk. Therefore, the roll amount caused by the reaction force during turning can be reduced.

Ninth Preferred Embodiment

Figure 21:
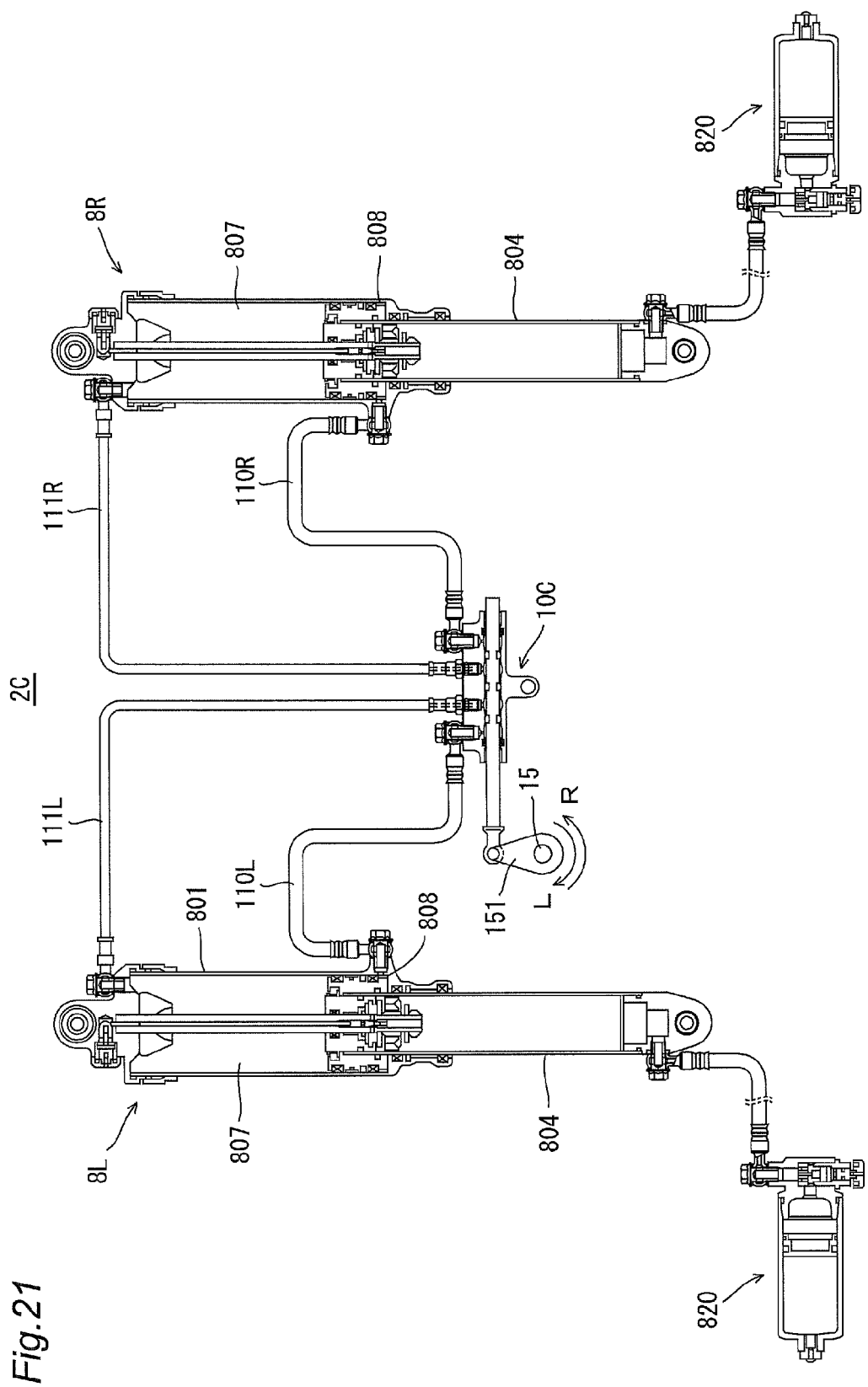
FIG. 21 is a view of the structure of an air suspension mechanism according to a ninth preferred embodiment of the invention.

A snowmobile according to a ninth preferred embodiment of the invention includes a suspension mechanism 2C shown in FIG. 21. The other structure of the snowmobile is the same as that of the snowmobile 100. The suspension mechanism 2C is different from the suspension mechanism 2A in that it has a new regulator 10C instead of the regulator 10A. The other structure of the suspension mechanism 2C is the same as that of the suspension mechanism 2A.

When the snowmobile advances straightforward, the regulator 10C connects the gas chambers 807 and 808 in each of the air shock absorbers 8L and 8R. When the handle 5 is steered to the left/right, the gas chambers 807 and 808 in the air shock absorber on the side opposite to the steering direction are separated in order to raise the reaction force. In short, while having a different structure from the regulator 10B according to the seventh preferred embodiment, the regulator 10C has the same function.

Figure 22:
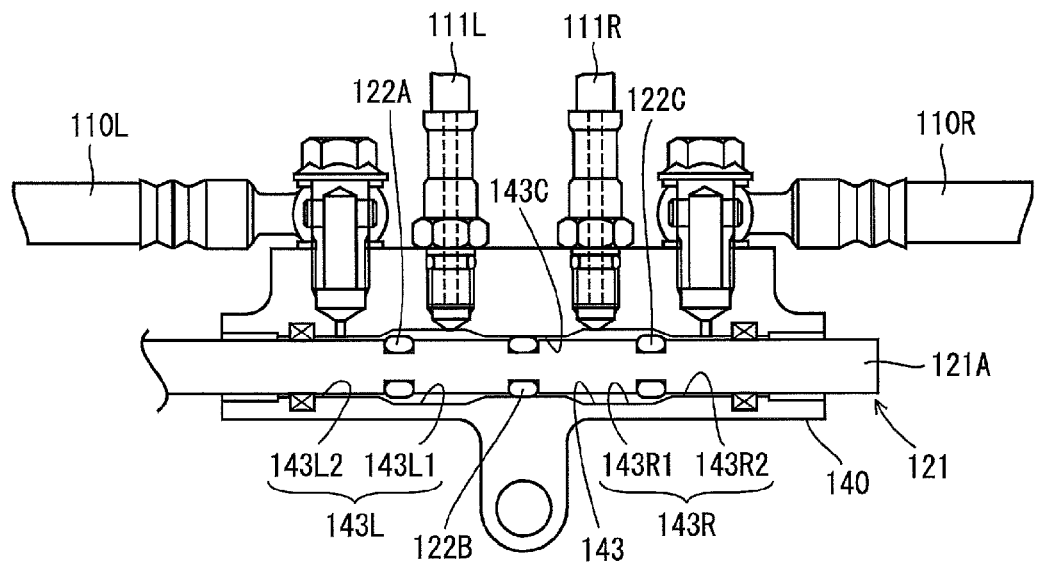
FIG. 22 is a sectional view of the regulator shown in FIG. 21.

FIG. 22 is a sectional view of the regulator 10C shown in FIG. 21. Referring to FIG. 22, the regulator 10C has the same structure as that of the regulator 10A connected to (in FIG. 11). The regulator 10C includes a valve box 140 and a valve element 121. The valve box 140 has an inner path 143. The path 143 has paths 143L, 143R, and 143C. The paths 143L, 143R, and 143C are coaxially provided. The path 143C is provided between the paths 143L and 143R.

The path 143L connects the gas chambers 807 and 808 in the air shock absorber 8L. The path 143L has paths 143L1 and 143L2. The path 143L1 is provided coaxially to the path 143L2. The path 143L1 is provided closer to the path 123C than the path 143L2. Referring to FIGS. 21 and 22, the path 143L1 is connected to the gas chamber 807 in the air shock absorber 8L through the gas hose 111L. The path 143L2 is connected to the gas chamber 808 in the air shock absorber 8L through the gas hose 110L. The path 143L1 has an inner diameter larger than that of the path 143R1.

The path 143R connects the gas chambers 807 and 808 in the air shock absorber 8R. The path 143R has paths 143R1 and 143R2. The path 143R1 is provided coaxially to the path 143R2. The path 143R1 is provided closer to the path 143C than the path 143R2. The path 143R1 is connected to the gas chamber 807 in the air shock absorber 8R through the gas hose 111R. The path 143R2 is connected to the gas chamber 808 in the air shock absorber 8R through the gas hose 110R. The path 143R1 has a larger inner diameter than that of the path 143R2.

The structure of the valve element 121 is the same as that shown in FIG. 12. However, the shaft 121A of the valve element 121 according to the present preferred embodiment slides to the right in FIG. 21 when the handle 5 is steered to the left. When the handle is steered to the right, the shaft 121A slides to the left as shown in FIG. 22. In short, the shaft 121A of the regulator 10C slides in the opposite direction to the shaft 121A of the regulator 10A.

Figure 23:
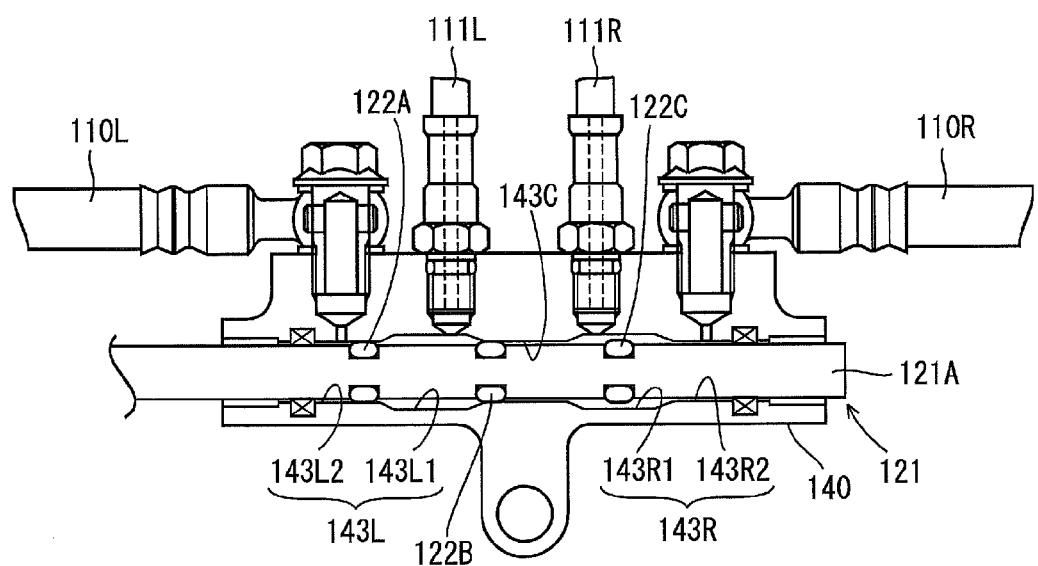
FIG. 23 is a sectional view of the regulator when the handle is steered.

The seal member 122A in FIG. 22 is provided in the path 143L. When the snowmobile advances straightforward and the handle 5 is steered to the left, the seal member 122A is placed in the path 143L1 as shown in FIG. 22. At the time, the path 143 is open. On the other hand, when the handle 5 is steered to the right, the shaft 121A slides to the left. Therefore, the seal member 122A is placed in the path 143L2 and closes the path 143L as shown in FIG. 23.

The seal member 122B is provided in the path 143C. The seal member 122B does not move outside the path 143C when the handle 5 is steered to the left/right.

The seal member 122C is provided in the path 143R. When the snowmobile advances straightforward, the seal member 122C is placed in the path 143R1 as shown in FIG. 22. When the handle 5 is steered to the right, the seal member 122C is also placed in the path 143R1 as shown in FIG. 22. Therefore, when the snowmobile advances straightforward and turns to the right, the path 143R is open. On the other hand, when the handle 5 is steered to the left, the shaft 121 slides to the right and the seal member 122C is placed in the path 143R2. Therefore, when the snowmobile turns to the left, the path 143R is closed.

Operation of Suspension Mechanism 2C

The operation of the suspension mechanism 2C is the same as that of the suspension mechanism 2B according to the seventh preferred embodiment. When the snowmobile advances straightforward, the seal member 122A opens the path 143L and the seal member 122C opens the path 143R as shown in FIG. 22. Therefore, the gas chambers 807 and 808 are connected in each of the air shock absorbers 8L and 8R.

On the other hand, when the handle 5 is steered to the left, the shaft 121A moves to the right in FIG. 22. When the handle 5 is steered further to the left, the seal member 122C is inserted into the path 143R2. At the time, the path 143R is closed, so that the gas chamber 807 is separated from the gas chamber 808 in the air shock absorber 8R. On the other hand, the seal member 122A is provided in the path 143L, and therefore the path 143L is kept open. Therefore, the gas chambers 807 and 808 in the air shock absorber 8L are kept connected. As the result, the reaction force of the air shock absorber 8L is maintained, while the reaction force of the air shock absorber 8R is raised. Therefore, the roll amount during the leftward turning of the snowmobile is reduced.

When the handle 5 is steered to the right, the shaft 121A moves to the left in FIG. 22. When the handle 5 is steered further to the right, the seal member 122A is inserted into the path 143L2 as shown in FIG. 23. At the time, the path 143L is closed, so that the gas chamber 807 is disconnected from the gas chamber 808 in the air shock absorber 8L. On the other hand, the seal member 122C is still placed in the path 143R1 and therefore the path 143R is kept open. Therefore, the gas chambers 807 and 808 in the air shock absorber 8R are connected. As a result, the reaction force of the air shock absorber 8R is maintained while the reaction force of the air shock absorber 8L is raised. Therefore, the roll amount during the rightward turning of the snowmobile is reduced.

As described above, the regulator 10C raises the reaction force of the air shock absorber on the side opposite to the turning direction and reduces the roll amount.

In this example, the inner diameter of the path 143L1 is larger than the inner diameter of the path 143L2. However, the inner diameter of the path 143L1 may be smaller than the inner diameter of the path 143L2. The regulator 10C needs only be arranged so that the seal member 122A moves from the path with the larger inner diameter to the path with the smaller inner diameter when the handle 5 is steered to the right. In addition, the gas hose 110L may be connected to the path 143L1 instead of the gas hose 111L and the path 143L2 may be connected to the gas hose 111L instead of the gas hose 110L. In short, the regulator 10C needs only be arranged so that the gas chambers 807 and 808 in the air shock absorber on the same side as the steering direction are disconnected from each other during turning.

Tenth Preferred Embodiment

According to the ninth preferred embodiment, when the handle 5 is steered to the left/right, in the pair of air shock absorbers 8L and 8R, the gas chambers 807 and 808 in the air shock absorber on the side opposite to the steering direction of the handle 5 are disconnected, while the gas chambers 807 and 808 in the air shock absorber on the same side as the steering direction of the handle 5 are kept connected. However, similarly to the eighth preferred embodiment, the gas chambers 807 and 808 in any of the pair of the air shock absorbers 8L and 8R may be disconnected when the handle 5 is steered to the left/right.

The structure of the snowmobile according to the tenth preferred embodiment is different from the structure of the snowmobile according to the ninth preferred embodiment only in the shape of the path 143. The other structure is the same as that of the snowmobile according to the ninth preferred embodiment.

Figure 24:
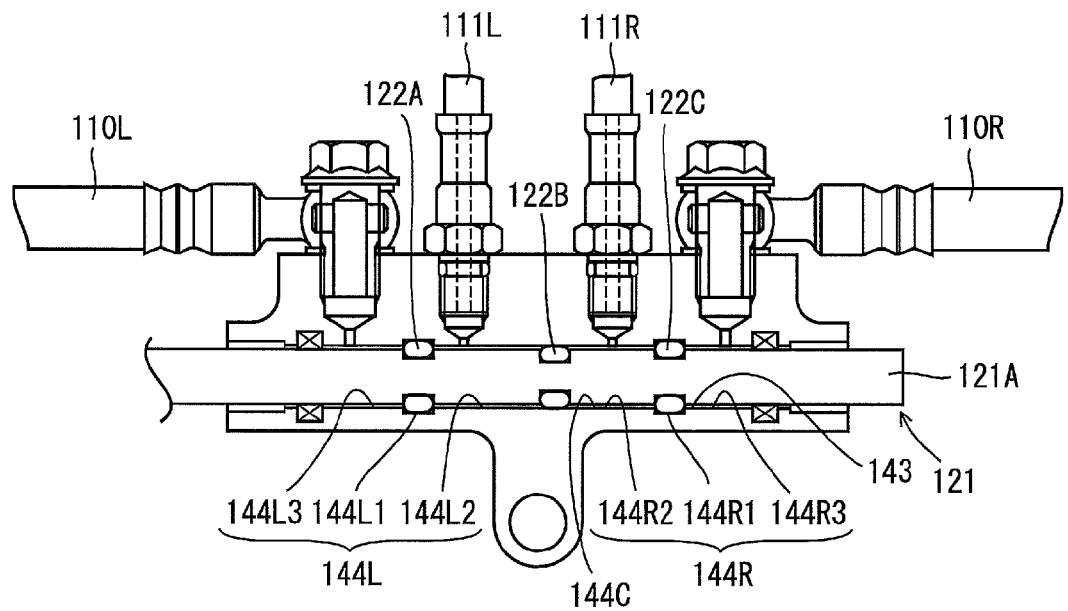
FIG. 24 is a sectional view of a regulator in an air suspension mechanism according to a tenth preferred embodiment of the invention.

Referring to FIG. 24, in the snowmobile according to the tenth preferred embodiment, the path 143 includes paths 144L, 144C, and 144R. The path 144C is provided between the paths 144L and 144R. The paths 144L, 144C, and 144R are provided coaxially to one another.

The path 144L connects the gas chambers 807 and 808 in the air shock absorber 8L. The path 144L has paths 144L1, 144L2 and 144L3. The paths 143L1 to 144L3 are provided coaxially to one another. The path 144L1 is provided between paths 144L2 and 144L3. The inner diameter of the path 144L1 is greater than the inner diameters of paths 144L2 and 144L3. The path 144L2 is provided closer to the path 144C than the path 144L3. The path 144L2 is connected to the gas chamber 807 in the air shock absorber 8L through the gas hose 111L. The path 144L3 is connected to the gas chamber 808 in the air shock absorber 8R through the gas hose 110L.

The path 144R connects the gas chambers 807 and 808 in the air shock absorber 8R. The path 144R has paths 144R1, 144R2, and 144R3. The paths 143R1 to 144R3 are provided coaxially to one another. The path 144R1 is provided between the paths 144R2 and 144R3. The inner diameter of the path 144R1 is larger than the inner diameters of the paths 144R2 and 144R3. The path 144R2 is provided closer to the path 144C than the path 144R3. The path 144R2 is connected to the gas chamber 807 in the air shock absorber 8R through the gas hose 111R. The path 144R3 is connected to the gas chamber 808 in the air shock absorber 8R through the gas hose 110R.

The seal member 122A of the valve element 121 is provided in the path 144L. The outer diameter of the seal member 122A is smaller than the inner diameter of the path 144L1 and larger than the inner diameters of the paths 144L2 and L3. The seal member 122B is provided in the path 144C. The outer diameter of the seal member 122B is larger than the inner diameter of the path 144C. The seal member 122C is provided in the path 144R. The outer diameter of the seal member 122C is smaller than the inner diameter of the path 144R1 and larger than the inner diameters of paths 144R2 and 144R3.

The function of the suspension mechanism according to the tenth preferred embodiment is the same as the function of the suspension mechanism according to the eighth preferred embodiment.

When the snowmobile advances straightforward, the seal member 122A is placed in the path 144L1 and the seal member 122C is placed in the path 144R1 as shown in FIG. 24. Therefore, the paths 144L and 144R are kept open. Therefore, the gas chamber 807 is connected to the gas chamber 808 in the air shock absorbers 8L and 8R.

Figure 25:
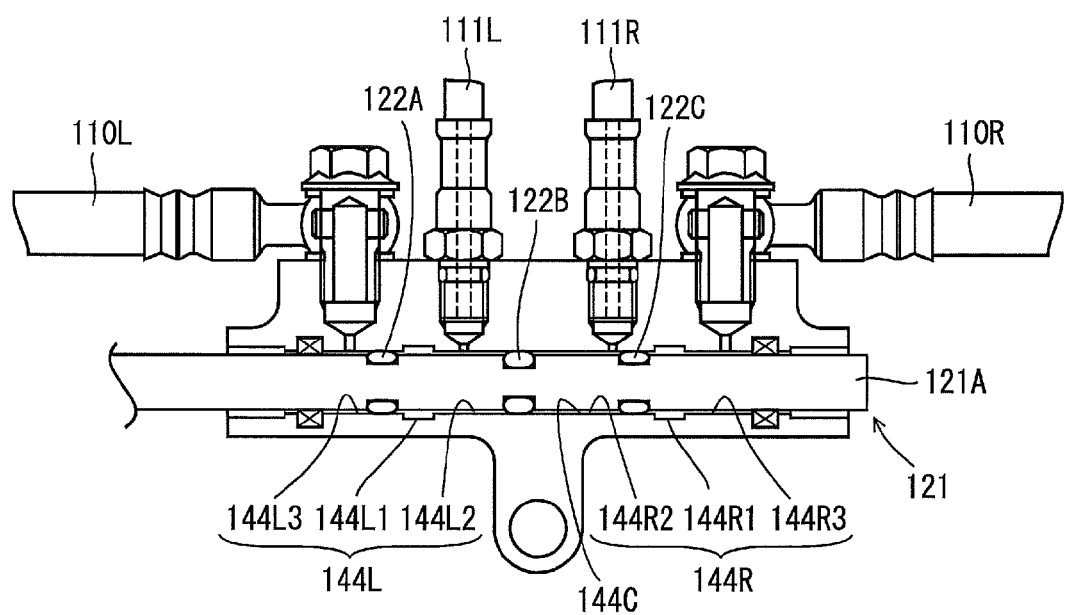
FIG. 25 is a sectional view of the regulator when the handle is steered.

When the handle 5 is steered to the right, the shaft 121A slides to the left in FIG. 24. When the handle 5 is steered further to the right, the seal member 122A is inserted in the path 144L3 and the seal member 122C is inserted into the path 144R2 as shown in FIG. 25. Therefore, the paths 144L and 144R are closed. As a result, in the air shock absorbers 8L and 8R, the gas chamber 807 is disconnected from the gas chamber 808 and the reaction forces of the air shock absorbers 8L and 8R are both raised. The air shock absorbers 8L and 8R are not easily expanded or shrunk in response to external force. Therefore, the amount of roll caused by reaction force during turning is reduced.

When the handle 5 is steered to the left, the shaft 121A slides to the right in FIG. 23. When the handle 5 is steered further to the left, the seal member 122A is inserted into the path 144L2 and the seal member 122C is inserted into the path 144R3. Therefore, the path 144L and 144R are closed. As a result, the reaction forces of the air shock absorbers 8L and 8R are both raised. The air shock absorbers 8L and 8R are not easily expanded or shrunk in response to external force. Therefore, the amount of roll caused by reaction force during turning is reduced.

Eleventh Preferred Embodiment

Figure 26:
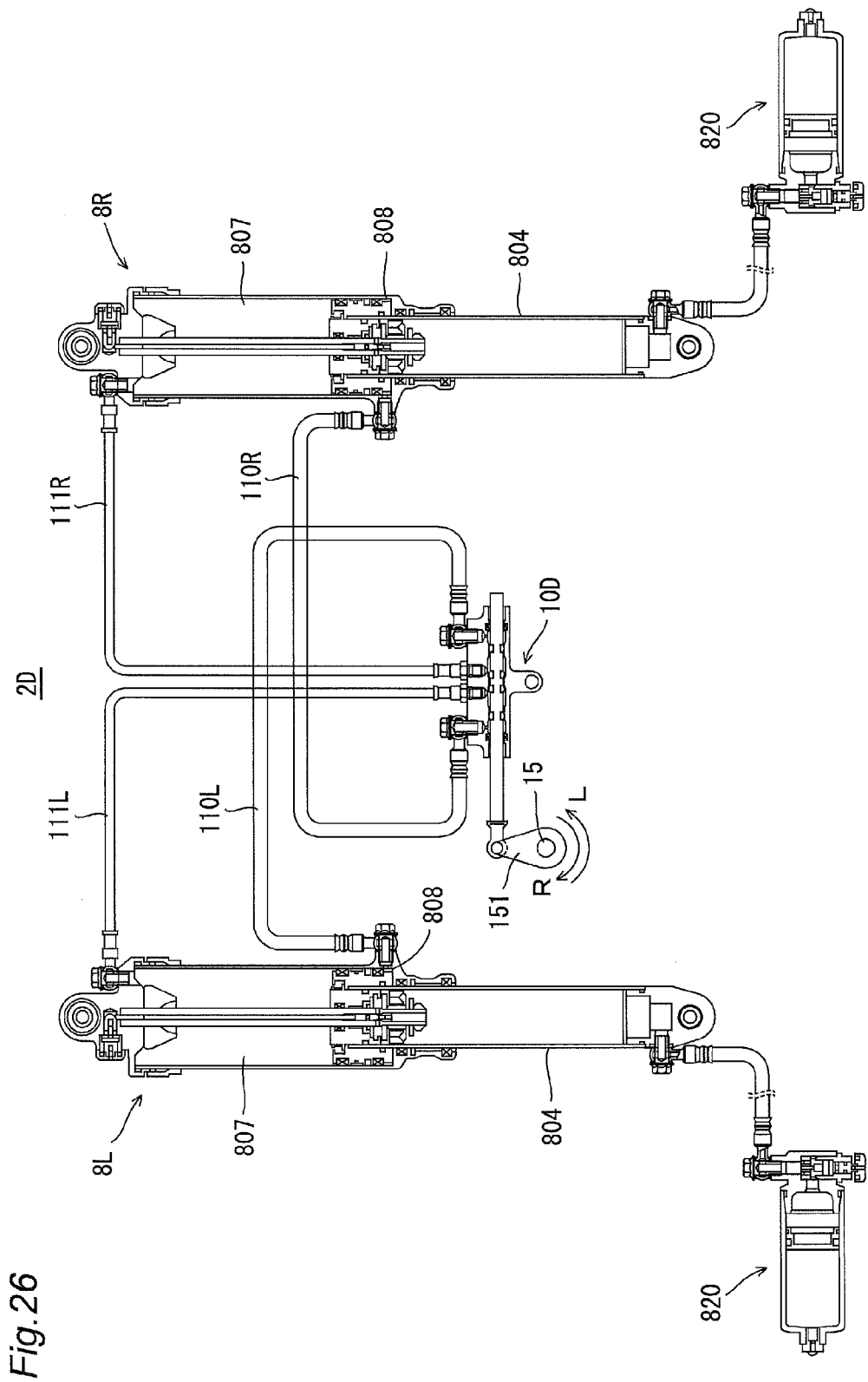
FIG. 26 is a view of the structure of an air suspension mechanism according to an eleventh preferred embodiment of the invention.

A snowmobile according to an eleventh preferred embodiment of the invention includes a suspension mechanism 2D shown in FIG. 26. The other structure of the snowmobile is the same as that of the snowmobile 100. The suspension mechanism 2D is different from the suspension mechanism 2A in that it has a new regulator 10D instead of the regulator 10A. The other structure of the suspension mechanism 2D is the same as that of the suspension mechanism 2A.

When the handle 5 is steered to the left/right, the regulator 10D connects the gas chamber 807 in the air shock absorber on the same side as the steering direction of the handle 5 and the gas chamber 808 in the air shock absorber on the opposite side to the steering direction of the handle 5. During turning, when the air shock absorber on the side opposite to the turning direction of the snowmobile shrinks, the air shock absorber on the same side as the turning direction also shrinks. Therefore, the roll amount is reduced.

Figure 27:
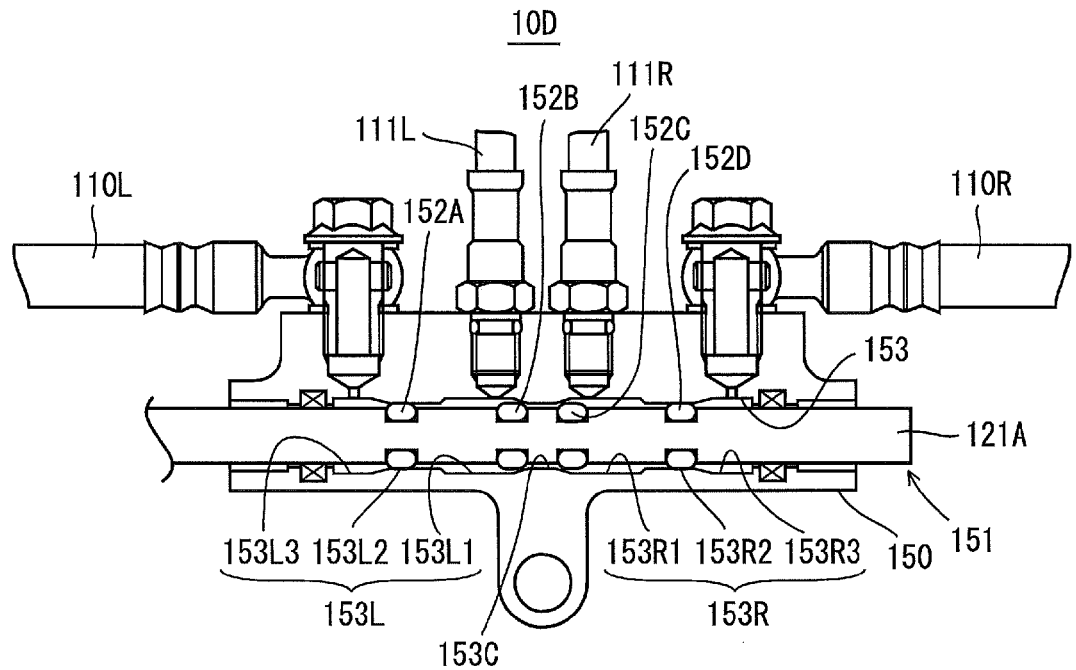
FIG. 27 is a sectional view of the regulator in FIG. 26.

FIG. 27 is a view of the peripheral structure of the regulator 10D in FIG. 26. Referring to FIG. 27, the regulator 10D has the same structure as that of the regulator 10A (see FIG. 11). The regulator 10D includes a valve box 150 and a valve element 151. The valve box 150 has an inner path 153. The path 153 includes paths 153L, 153R, and 153C. The paths 153L, 153R, and 153C are provided coaxially. The path 153C is provided between the paths 153L and 153R.

The path 153L connects the gas chamber 807 in the air shock absorber 8L and the gas chamber 808 in the air shock absorber 8R. The path 153L has the paths 153L1, 153L2, and 153L3. The paths 153L1 to 153L3 are provided coaxially to one another. The path 153L1 is provided closer to the path 153C than the path 153L3. The path 153L2 is provided between the paths 153L1 and 153L3.

Referring to FIGS. 26 and 27, the path 153L1 is connected to the gas chamber 807 in the air shock absorber 8L through the gas hose 111L. The path 153L3 is connected to the gas chamber 808 in the air shock absorber 8R through the gas hose 110R. The path 153L2 has a larger inner diameter than the inner diameters of the paths 153L1 and 153L3.

The path 153R connects the gas chamber 807 in the air shock absorber 8R and the gas chamber 808 in the air shock absorber 8L. The path 153R has paths 153R1, 153R2, and 153R3. The paths 153R1 to 153R3 are provided coaxially to one another. The path 153R1 is provided closer to the path 153C than the path 153R3. The path 153R2 is provided between the paths 153R1 and 153R3.

Referring to FIGS. 26 and 27, the path 153R1 is connected to the gas chamber 807 in the air shock absorber 8R through the gas hose 111R. The path 153R3 is connected to the gas chamber 808 in the air shock absorber 8L through the gas hose 110L. The path 153R2 has an inner diameter smaller than the inner diameter of paths 153R1 and 153R3.

The path 153C is provided between the paths 153L and 153R. The inner diameter of the path 153C is smaller than the inner diameters of the paths 153L1 and 153R1.

Referring to FIG. 27, the valve element 151 includes a shaft 121A and seal members 152A to 152D. Referring to FIG. 26, the shaft 121A is coupled to the handle 5 through a coupling member 151 and a steering shaft 15. When the handle is steered to the right, the shaft 121A slides to the right in FIG. 26. When the handle is steered to the left, the shaft 121A slides to the left in FIG. 26.

Referring to FIG. 27, the seal members 152A to 152D are made of an elastic material and provided at the outer circumference of the shaft 121A. The seal member 152A is provided in the path 153L and opens/closes the path 153L. When the snowmobile advances straightforward, the seal member 152A is placed in the path 153L2. The outer diameter of the seal member 152A is larger than the inner diameter of the path 152L2 and smaller than the outer diameters of 152L1 and 152L3. Therefore, when the seal member 152A is placed in the path 153L2, the path 153L is closed, and when the seal member 152A is placed in the path 153L1 or 153L3, the path 153L is opened.

The seal member 152B reciprocates between the paths 153L1 and 153C as the shaft 121A slides. The outer diameter of the seal member 152B is smaller than the inner diameter of the path 153L1 and larger than the inner diameter of the path 153C. The seal member 152C reciprocates between the paths 153R1 and 153C as the shaft 121A slides. The outer diameter of the seal member 152C is smaller than the inner diameter of the path 153R1 and larger than the inner diameter of the path 153C.

When the snowmobile advances straightforward, the seal member 152B is placed in the path 153L1 and the seal member 152C is placed in the path 153R1. Therefore, the gas chamber 807 in the air shock absorber 8L and the gas chamber 807 in the air shock absorber 8R are connected. When the handle 5 is steered to the left/right, the seal member 152B or 152C is placed in the path 153C. Therefore, the gas chamber 807 in the air shock absorber 8L is disconnected from the gas chamber 807 in the air shock absorber 8R.

The seal member 152D is placed in the path 153R and open/closes the path 153R. When the snowmobile advances straightforward, the seal member 152D is placed in the path 153R2. The outer diameter of the seal member 152D is larger than the inner diameter of the path 152R2 and smaller than the inner diameters of the paths 152R1 and 152R3. Therefore, when the seal member 152D is placed in the path 153R2, the path 153R is closed and when the seal member 152D is placed in the path 153L1 or 153L3, the path 153R is opened.

Operation of Suspension Mechanism 2D

When the snowmobile advances straightforward, the seal member 152A closes the path 153L and the seal member 152D closes path 153R as shown in FIG. 27. In addition, the seal members 152B and 152C are not inserted in the path 153C and do not block the path 153C. In this case, neither the gas chamber 808 in the air shock absorber 8L nor the gas chamber 808 in the air shock absorber 8R is connected to any of the gas chambers. On the other hand, the gas chamber 807 in the air shock absorber 8L and the gas chamber 807 in the air shock absorber 8R are connected to each other.

Figure 28:
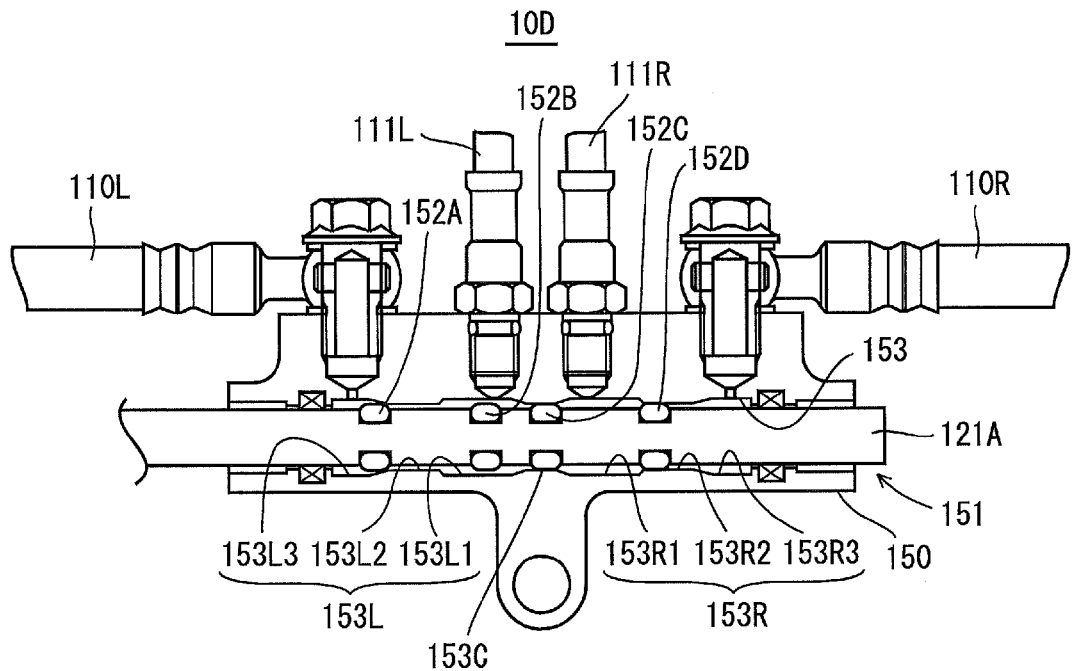
FIG. 28 is a sectional view of the regulator when the handle is steered.

When the handle 5 is steered to the left, the shaft 121A slides to the left in FIG. 28. As a result, the seal member 152C blocks the path 153C. Furthermore, the seal member 152D keeps the path 153R closed. In addition, the seal member 152A moves to the path 153L3 from the path 153L2 and opens the path 153L.

Since the path 153C is closed and the path 153L is opened, the gas chamber 807 in the air shock absorber 8L is connected to the gas chamber 808 in air shock absorber 8R. On the other hand, the gas chamber 807 in the air shock absorber 8R and the gas chamber 808 in the air shock absorber 8L are not connected to any of the gas chambers and sealed.

When the snowmobile turns to the left, the air shock absorber 8R on the opposite side to the turning direction of the snowmobile shrinks. Therefore, the pressure in the gas chamber 808 in the air shock absorber 8R is lowered. The gas chamber 808 in the air shock absorber 8R is connected to the gas chamber 807 in the air shock absorber 8L as described above. Therefore, the pressure in the gas chamber 807 in the air shock absorber 8L is lowered and the air shock absorber 8L shrinks. In short, when the snowmobile turns to the left and the air shock absorber 8R shrinks by centrifugal force, the air shock absorber 8L also shrinks. Therefore, the amount of roll during turning is reduced.

When the handle 5 is steered to the right, the shaft 121A slides to the right in FIG. 27. At the time, the seal member 152B blocks the path 153C. Furthermore, the seal member 152D moves from the path 153R2 to the path 153R3 to open the path 153R. Furthermore, the seal member 152A moves to the right side but remains in the path 153L2. Therefore, the path 153L is kept closed.

In this case, the gas chamber 807 in the air shock absorber 8R is connected to the gas chamber 808 in the air shock absorber 8L. The gas chamber 807 in the air shock absorber 8L and the gas chamber 808 in the air shock absorber 8R are not connected to any of the gas chambers and sealed.

As in the foregoing, when the snowmobile turns to the right and the air shock absorber 8L shrinks by centrifugal force, the air shock absorber 8R also shrinks. Therefore, the roll amount during turning is reduced.

According to the eleventh preferred embodiment described above, the gas chamber 807 in the air shock absorber 8L and the gas chamber 807 in the air shock absorber 8R are connected when the snowmobile advances straightforward. However, the gas chamber 807 in the air shock absorber 8L may be disconnected from the gas chamber 807 in the air shock absorber 8R when the snowmobile advances straightforward. Alternatively, the gas chambers 807 and 808 in each of the air shock absorbers 8L and 8R may be connected or all the gas chambers 807 and 808 may be connected when the snowmobile advances straightforward. When the snowmobile turns to the left/right, the gas chamber 807 in the air shock absorber on the same side as the turning direction may be connected to the gas chamber 808 in the air shock absorber on the opposite side to the turning direction, and the other gas chambers may be sealed.

According to the present preferred embodiments, the saddle riding type vehicle is a snowmobile. However, the saddle riding type vehicle is not limited to the snowmobile. The saddle riding type vehicle includes for example a four-wheeled buggy. As for a four-wheeled buggy, the suspension mechanism supports a pair of left and right front wheels in place of the pair of left and right skis.

In the above-described preferred embodiments, the cylinder 801 of the air shock absorber 8 is attached to the frame 30 and the piston rod 804 is attached to the lower arm 23. However, the cylinder 801 may be attached to the lower arm 23 and the piston rod 804 may be attached to the frame 30. The air shock absorber 8 may be provided upside down.

In the above-described preferred embodiments, the gas is air. However, gas other than air such as nitrogen may be used.

In the above-described second and fourth preferred embodiments, the instruction device 701 includes the switching device 730. However, instead of providing the switching device 730 in the instruction device 701, each of the variable throttles 711L, 711R, 721L, and 721R in the supply device 710 and the exhaust device 720 may include an electromagnetic valve. In this case, the CPU 700 in the instruction device 701 outputs a supply instruction and an exhaust instruction to each of the variable throttles and the electromagnetic valves.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A saddle riding vehicle, comprising:
  a vehicle body;
  a handle provided at a front portion of the vehicle body; and
  a suspension mechanism provided at the front portion of the vehicle body to support a pair of left and right front wheels or a pair of left and right skis,
  the suspension mechanism comprising:
  a pair of left and right arm members that supports the pair of front wheels or the pair of skis in a vertically movable manner;
  a pair of left and right air shock absorbers coupled to the pair of arm members, the pair of air shock absorbers each comprising,
  a cylinder that stores gas,
  a piston stored in the cylinder and having a front surface and a back surface,
  a piston rod coupled to the back surface of the piston,
  a first gas chamber provided on a side of the front surface of the piston in the cylinder,
  a second gas chamber provided on a side of the back surface of the piston in the cylinder; and
  a regulator that regulates pressure in the first gas chamber and/or the second gas chamber in response to steering of the handle.

2. The saddle riding vehicle according to claim 1, wherein the regulator increases a reaction force of an air shock absorber provided on the opposite side to a steering direction of the handle in response to a steering angle of the handle and lowers a reaction force of an air shock absorber provided on the same side as the steering direction of the handle in response to a steering angle of the handle.

3. The saddle riding vehicle according to claim 2, wherein the regulator pressurizes the second gas chamber in the air shock absorber provided on the same side as the steering direction of the handle and decompresses the second gas chamber in the air shock absorber on the opposite side to the steering direction of the handle.

4. The saddle riding vehicle according to claim 3, wherein the pair of air shock absorbers comprises:
  a left air shock absorber provided on a left side of the saddle riding vehicle; and
  a right air shock absorber provided on a right side of the saddle riding vehicle,
  the regulator comprises:
  a regulating cylinder that stores gas;
  first and second regulating gas chambers provided next to each other in the regulating cylinder; and
  a regulating piston provided between the first and second regulating gas chambers to move in the regulating cylinder synchronously with rotation of the handle,
  the first regulating gas chamber is communicated with the second gas chamber in the left air shock absorber,
  the second regulating gas chamber is communicated with the second gas chamber in the right air shock absorber, and
  the regulating piston moves a distance corresponding to the steering angle toward the first regulating gas chamber when the handle is steered to the left and a distance corresponding to the steering angle toward the second regulating gas chamber when the handle is steered to the right.

5. The saddle riding vehicle according to claim 4, wherein the regulating cylinder has a cylindrical shape having an inner circumferential surface,
  the inner circumferential surface has a groove that extends in the circumferential direction at a part opposed to the regulating piston when the steering angle is 0°, and
  the piston comprises:
  a piston main body having an outer circumferential surface; and
  a piston ring attached at the outer circumferential surface and having a width smaller than that of the groove and an outer diameter smaller than an inner diameter of the inner circumferential surface at a bottom of the groove.

6. The saddle riding vehicle according to claim 3, wherein the second gas chamber has a smaller capacity than that of the first gas chamber.

7. The saddle riding vehicle according to claim 3, wherein the regulator comprises:
  an accumulator that stores compressed gas;
  a detector that detects the steering angle;
  a supply device that supplies the compressed gas to the second gas chamber in one of the pair of air shock absorbers at a flow rate according to an instruction;
  an exhaust device that discharges the gas in the second gas chamber in one of the pair of air shock absorbers at a flow rate according to an instruction; and
  an instruction device that instructs the supply device to supply the compressed gas to the second gas chamber in the air shock absorber provided on the same side as the steering direction of the handle at a flow rate corresponding to the steering angle and the exhaust device to discharge the gas in the second gas chamber in the air shock absorber provided on the opposite side to the steering direction of the handle at a flow rate corresponding to the steering angle.

8. The saddle riding vehicle according to claim 2, wherein the regulator decompresses the first gas chamber in the air shock absorber provided on the same side as the steering direction of the handle and pressurizes the first gas chamber in the air shock absorber provided on the opposite side to the steering direction of the handle.

9. The saddle riding vehicle according to claim 8, wherein the pair of air shock absorbers comprises:
  a left air shock absorber provided on a left side of the saddle riding vehicle; and
  a right air shock absorber provided on a right side of the saddle riding vehicle,
  the regulator comprises:
  a regulating cylinder that stores the gas;
  first and second regulating gas chambers provided next to each other in the regulating cylinder; and a regulating piston provided between the first and second regulating gas chambers and moving in the cylinder synchronously with rotation of the handle, the first regulating gas chamber is communicated with the first gas chamber in the left air shock absorber, the second regulating gas chamber is communicated with the first gas chamber in the right air shock absorber, and the regulating piston moves a distance corresponding to the steering angle toward the second regulating gas chamber when the handle is steered to the left and a distance corresponding to the steering angle toward the first regulating gas chamber when the handle is steered to the right.

10. The saddle riding vehicle according to claim 8, wherein the regulator comprises:

an accumulator that stores compressed gas;

a detector that detects the steering angle;

a supply device that supplies the compressed gas to one of the first gas chambers in the pair of air shock absorbers at a flow rate according to an instruction;

an exhaust device that discharges the gas in one of the first gas chambers in the pair of air shock absorbers at a flow rate according to an instruction; and an instruction device that instructs the supply device to supply the compressed gas to the first gas chamber in the air shock absorber provided on the opposite side to the steering direction of the handle at a flow rate corresponding to the steering angle and the exhaust device to discharge the gas in the first gas chamber in the air shock absorber provided on the same side as the steering direction of the handle at a flow rate corresponding to the steering angle.

11. The saddle riding vehicle according to claim 1, wherein the regulator connects the first gas chamber to the second gas chamber in response to steering of the handle.

12. The saddle riding vehicle according to claim 11, wherein the regulator comprises:

a path that connects the first gas chamber to the second gas chamber; and a valve element provided in the path and coupled to the handle to open/close the path in response to steering of the handle.

13. The saddle riding vehicle according to claim 12, wherein the pair of air shock absorbers comprises:

a left air shock absorber provided on a left side of the saddle riding vehicle; and a right air shock absorber provided on a right side of the saddle riding vehicle, the path comprises:

a left path that connects the first gas chamber in the left air shock absorber and the second gas chamber in the left air shock absorber; and a right path that connects the first gas chamber in the right air shock absorber and the second gas chamber in the right air shock absorber, and the valve element opens/closes the right path and/or the left path in response to steering of the handle.

14. The saddle riding vehicle according to claim 13, wherein the valve element closes the left path and the right path when the saddle riding vehicle advances straightforward, opens the left path while keeping the right path closed when the handle is steered to the left and opens the right path while keeping the left path closed when the handle is steered to the right.

15. The saddle riding vehicle according to claim 13, wherein the valve element opens the left path and the right path when the saddle riding vehicle advances straightforward, closes the right path while keeping the left path open when the handle is steered to the left and closes the left path while keeping the right path open when the handle is steered to the right.

16. The saddle riding vehicle according to claim 13, wherein the valve element opens the left path and the right path when the saddle riding vehicle advances straightforward and closes the left path and the right path when the handle is steered to the left or the right.

17. The saddle riding vehicle according to claim 12, wherein the pair of air shock absorbers comprises a left air shock absorber provided on a left side of the saddle riding vehicle; and a right air shock absorber provided on a right side of the saddle riding vehicle, the path comprises:

a first path that connects the first gas chamber in the left air shock absorber to the second gas chamber in the right air shock absorber; and a second path that connects the first gas chamber in the right air shock absorber to the second gas chamber in the left air shock absorber, and the valve element opens/closes the first or second path in response to a steering angle of the handle.

18. The saddle riding vehicle according to claim 17, wherein the valve element closes the second path and opens the first path when the handle is steered to the left and closes the first path and opens the second path when the handle is steered to the right.

19. The saddle riding vehicle according to claim 12, wherein the path comprises a small diameter path and a large path having an inner diameter larger than that of the small diameter path, the regulator comprises a valve box having the path, and the valve element comprises:

a shaft coupled to the handle to slide in the path; and a seal member attached to the shaft and having an outer diameter larger than the inner diameter of the small diameter path and smaller than the inner diameter of the large diameter path.

20. The saddle riding vehicle according to claim 12, wherein the regulator comprises a valve box having an insert hole, the valve element comprises a shaft inserted in the insert hole and coupled to the handle to rotate in the insert hole, and the path crosses an axial direction of the shaft and penetrates through the shaft.

* * * * *